US012769549B2

(12) United States Patent
Hornung et al.

(10) Patent No.: US 12,769,549 B2
(45) Date of Patent: Oct. 20, 2026

(54) SYNCHRONIZATION OF PREDETERMINED CLASS OF LOAD/STORE OPERATIONS

(71) Applicant: Arm Limited, Cambridge (GB)

(72) Inventors: Alexander Alfred Hornung, Cambridge (GB); Ian Michael Caulfield, Cambridge (GB); John Michael Horley, Hauxton (GB); Madhusudana Reddy Vangireddy, Anantapur (IN)

(73) Assignee: Arm Limited, Cambridge (GB)

( * ) Notice: Subject to any disclaimer, the term of this patent is extended or adjusted under 35 U.S.C. 154(b) by 44 days.

(21) Appl. No.: 19/106,522

(22) PCT Filed: Jul. 13, 2023

(86) PCT No.: PCT/GB2023/051833
§ 371 (c)(1),
(2) Date: Feb. 25, 2025

(87) PCT Pub. No.: WO2024/047322
PCT Pub. Date: Mar. 7, 2024

(65) Prior Publication Data

US 2026/0056741 A1 Feb. 26, 2026

(30) Foreign Application Priority Data

Sep. 2, 2022 (IN) ............................. 202211050232
Oct. 20, 2022 (GB) ...................................... 2215517

(51) Int. Cl.
*G06F 9/30* (2018.01)
*G06F 9/38* (2018.01)

(52) U.S. Cl.
CPC ...... *G06F 9/30043* (2013.01); *G06F 9/30047* (2013.01); *G06F 9/30087* (2013.01); *G06F 9/30145* (2013.01); *G06F 9/3858* (2023.08)

(58) Field of Classification Search
CPC ............. G06F 9/30043; G06F 9/30047; G06F 9/30087; G06F 9/30145; G06F 9/3858;
(Continued)

(56) References Cited

U.S. PATENT DOCUMENTS 9,710,268 B2 * 7/2017 Meier .................... G06F 9/3861
2013/0173886 A1 * 7/2013 Dockser ................ G06F 9/3838 712/216
2013/0305022 A1 11/2013 Eisen et al.
2014/0215191 A1 * 7/2014 Kanapathipillai .... G06F 9/3834 712/220

(Continued)

FOREIGN PATENT DOCUMENTS

EP 1387251 A2 2/2004
EP 2101267 A2 9/2009
GB 2115963 A 9/1983

OTHER PUBLICATIONS

International Search Report for International application No. GB2215517.0, dated Apr. 5, 2023.

(Continued)

*Primary Examiner* — Farley Abad
(74) *Attorney, Agent, or Firm* — NIXON & VANDERHYE P.C.

(57) ABSTRACT

For a predetermined class of load/store operations, load/store processing circuitry buffers store data of predetermined-class store operations in a predetermined-class store buffer, and controls store-to-load forwarding of store data from that buffer to predetermined-class load operations. A predetermined-class-load/store synchronization instruction controls the load/store processing circuitry to enforce that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which address ranges overlap, the hazarding younger non-predetermined-class
(Continued)

load/store operation observes a result of the hazarding older predetermined-class store operation. In absence of any intervening predetermined-class-load/store synchronization instruction between a given older predetermined-class store operation and a given younger non-predetermined-class load/store operation with overlapping address range, the given younger non-predetermined-class load/store operation is permitted to fail to observe a result of the given older predetermined-class store operation.

24 Claims, 11 Drawing Sheets

(58) Field of Classification Search
CPC .. G06F 9/3004; G06F 9/30072; G06F 9/3806; G06F 9/3826; G06F 9/3838; G06F 9/3834
See application file for complete search history.

(56) References Cited

U.S. PATENT DOCUMENTS

| | | | | |
|---|---|---|---|---|
| 2014/0229718 | A1* | 8/2014 | Jackson | G06F 9/3834 712/225 |
| 2014/0380022 | A1 | 12/2014 | Kai et al. | |
| 2015/0067305 | A1 | 3/2015 | Olson et al. | |
| 2016/0179545 | A1* | 6/2016 | Garifullin | G06F 9/3838 712/205 |
| 2019/0310845 | A1 | 10/2019 | Ramani et al. | |
| 2020/0183736 | A1* | 6/2020 | Kesiraju | G06F 9/30043 |
| 2021/0026632 | A1* | 1/2021 | Dooley | G06F 9/3005 |
| 2023/0063976 | A1* | 3/2023 | Fernsler | G06F 9/30036 |

OTHER PUBLICATIONS

International Search Report and Written Opinion for International application No. PCT/GB2023051833, dated Oct. 18, 2023.

* cited by examiner

SYNCHRONIZATION OF PREDETERMINED CLASS OF LOAD/STORE OPERATIONS

BACKGROUND

Technical Field

The present technique relates to the field of data processing.

Technical Background

Load/store operations are operations executed by a data processing system to request access to data in a memory system. Load/store operations can also be used by a processor core to control components (such as I/O devices or hardware accelerators) of a data processing system that communicate with the processor core via a memory system interconnect, by triggering a read/write request to be issued to the memory system specifying a memory address mapped to that component.

There can be a challenge in controlling the ordering of load/store operations, to enforce that a younger load/store operation processed after an older load/store operation to an overlapping address range observes the result of the older load/store operation. Hardware circuit logic for managing such ordering enforcement can be expensive and complex to implement.

SUMMARY

At least some examples of the present technique provide an apparatus comprising:

load/store processing circuitry to process load/store operations, where for a predetermined class of load/store operations, the load/store processing circuitry is configured to buffer store data of store operations of the predetermined class in a predetermined-class store buffer, and control store-to-load forwarding of store data from the predetermined-class store buffer to load operations of the predetermined class; and an instruction decoder responsive to a predetermined-class-load/store synchronization instruction to control the load/store processing circuitry to enforce that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation; in which:

in absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the load/store processing circuitry is configured to permit the given younger non-predetermined-class load/store operation to yield a result which fails to observe a result of the given older predetermined-class store operation.

At least some examples of the present technique provide a non-transitory computer-readable medium to store computer-readable code for fabrication of the apparatus comprising:

load/store processing circuitry to process load/store operations, where for a predetermined class of load/store operations, the load/store processing circuitry is configured to buffer store data of store operations of the predetermined class in a predetermined-class store buffer, and control store-to-load forwarding of store data from the predetermined-class store buffer to load operations of the predetermined class; and an instruction decoder responsive to a predetermined-class-load/store synchronization instruction to control the load/store processing circuitry to enforce that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation; in which:

in absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the load/store processing circuitry is configured to permit the given younger non-predetermined-class load/store operation to yield a result which fails to observe a result of the given older predetermined-class store operation.

At least some examples of the present technique provide a method comprising:

for a predetermined class of load/store operations, buffering store data of store operations of the predetermined class in a predetermined-class store buffer, and controlling store-to-load forwarding of store data from the predetermined-class store buffer to load operations of the predetermined class;

in response to a predetermined-class-load/store synchronization instruction, controlling load/store processing circuitry to control that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation; in which:

in absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the given younger non-predetermined-class load/store operation is permitted to yield a result which fails to observe a result of the given older predetermined-class store operation.

At least some examples of the present technique provide an apparatus comprising:

load/store processing circuitry to process load/store operations, including guarded-control-stack (GCS) load/store operations for accessing a GCS data structure for protecting return state information for returning from a function call or exception; and an instruction decoder responsive to a GCS synchronization instruction to control the load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation; in which:

in absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the load/store processing circuitry is configured to permit the given younger non-GCS load/store operation to yield a result which fails to observe a result of the given older GCS store operation.

At least some examples of the present technique provide a non-transitory computer-readable medium to store computer-readable code for fabrication of the apparatus comprising:

load/store processing circuitry to process load/store operations, including guarded-control-stack (GCS) load/store operations for accessing a GCS data structure for protecting return state information for returning from a function call or exception; and an instruction decoder responsive to a GCS synchronization instruction to control the load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation; in which:

in absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the load/store processing circuitry is configured to permit the given younger non-GCS load/store operation to yield a result which fails to observe a result of the given older GCS store operation.

At least some examples of the present technique provide a method comprising:

processing load/store operations, including guarded-control-stack (GCS) load/store operations for accessing a GCS data structure for protecting return state information for returning from a function call or exception; and in response to a GCS synchronization instruction, controlling load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation; in which:

in absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the given younger non-GCS load/store operation is permitted to yield a result which fails to observe a result of the given older GCS store operation.

Further aspects, features and advantages of the present technique will be apparent from the following description of examples, which is to be read in conjunction with the accompanying drawings.

DESCRIPTION OF EXAMPLES

Figure 1:
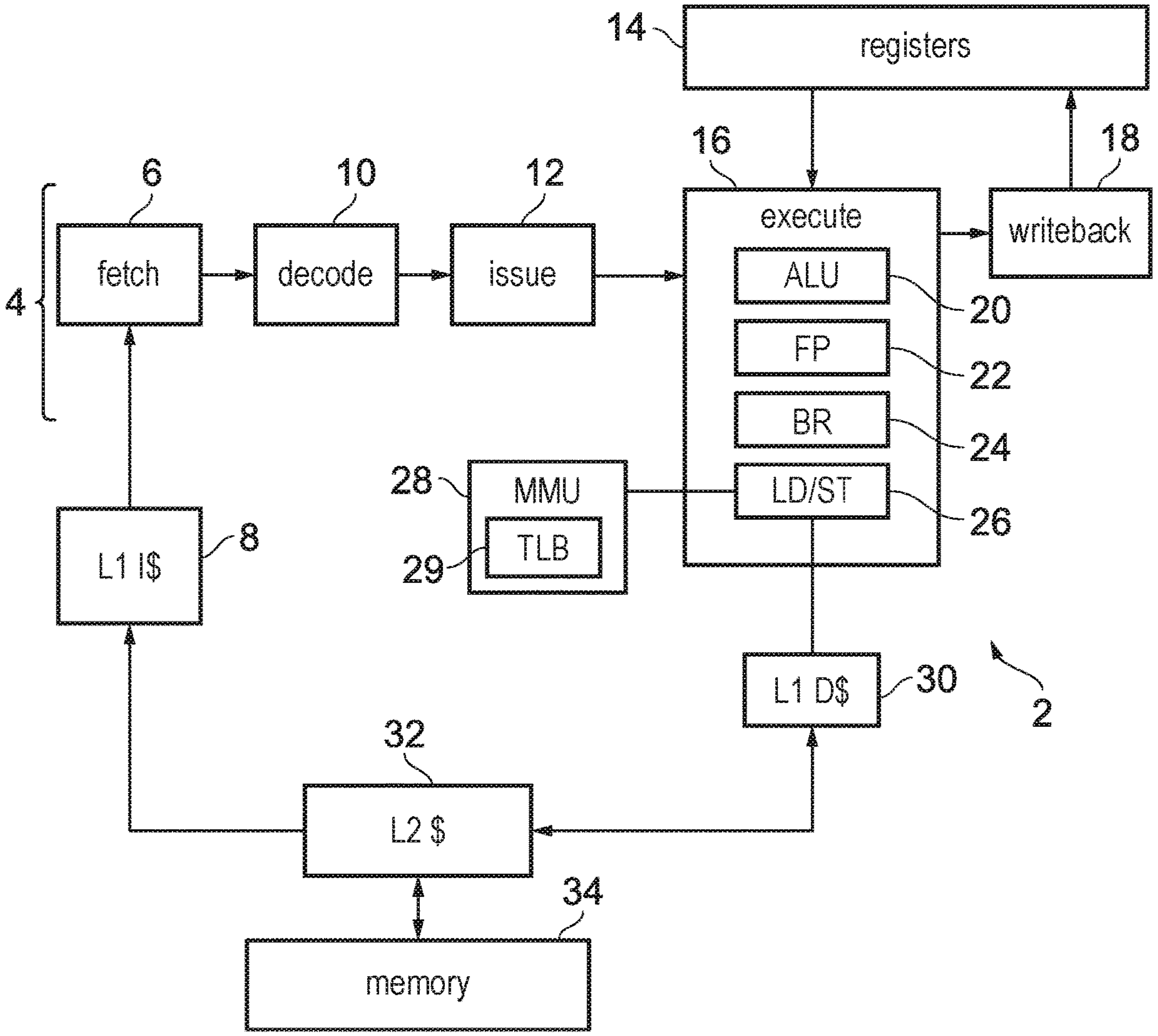
FIG. 1 illustrates an example of a data processing apparatus.

An apparatus comprises load/store processing circuitry to process load/store operations, where for a predetermined class of load/store operations, the load/store processing circuitry buffers store data of store operations of the predetermined class in a predetermined-class store buffer, and controls store-to-load forwarding of store data from the predetermined-class store buffer to load operations of the predetermined class. Store-to-load forwarding is a technique which allows some load requests to be processed without needing to issue an access request to a cache or memory. Store data associated with pending store operations can be buffered in a store buffer (implemented in hardware) associated with the load/store processing circuitry, and then if a load operation corresponds to an address of the buffered store data, at least part of that load operation's data can be obtained from the store buffer, rather than requesting that data from a cache. Forwarding the store buffer's data allows the ordering of the store and load to be enforced more efficiently than if the load had to wait for the data to be available in the cache, and can also help improve performance for other load/store operations because the reduced demand placed on the cache to service cache requests for loads which can benefit from store-to-load forwarding frees up some cache bandwidth for servicing other requests.

The apparatus has an instruction decoder responsive to a predetermined-class-load/store synchronization instruction to control the load/store processing circuitry to enforce that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation. In absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the load/store processing circuitry permits the given younger non-predetermined-class load/store operation to yield a result which fails to observe a result of the given older predetermined-class store operation.

With this approach, there is no need to enforce an ordering requirement between an older store operation of the predetermined class and a younger load/store operation which is not of the predetermined class, unless a predetermined-class-load/store synchronization instruction appears in program order between the older predetermined-class store operation and the younger non-predetermined-class load/store operation. This is unusual because normally one would expect that all younger load/store operations should observe the result of any older store operation to the same address.

However, the inventors recognised that there may be a predetermined class of load/store operations for which addresses accessed by that class of load/store operations are relatively unlikely to be accessed by load/store operations not of the predetermined class. Therefore, by providing an instruction which can be used by a programmer or compiler to identify the rare occasions when synchronization is needed between a store operation of the predetermined class and a load/store operation not of the predetermined class, this allows for much simpler hardware circuit logic for processing the load/store operations of the predetermined class, which on the majority of occasions need not check for address hazards between predetermined-class load/store operations and non-predetermined-class load/store operations and so, for example, need not have the full control logic used for regular load/store operations to check for address hazards and enforce ordering.

The load/store processing circuitry may be incapable of performing store-to-load forwarding of store data from predetermined-class store operations to non-predetermined-class load operations using the predetermined-class store buffer. Hence, store-to-load forwarding using the predetermined-class store buffer may be supported among load/store operations of the predetermined class, but not between a load/store operation of the predetermined class and a load/store operation not of the predetermined class. This can simplify the circuit logic and reduce circuit area and power consumption. This may exploit the fact that, as it is expected to be rare that a load/store operation not of the predetermined class accesses the same address as a load/store operation of the predetermined class, incurring the circuit area and power cost of circuit logic to enable forwarding of store data from a predetermined-class store operation to a non-predetermined-class load operation may not be justified. If the predetermined-class-load/store synchronization instruction is executed and so a given younger non-predetermined-class load/store operation does need to observe the results of an older predetermined-class store operation, this can be enforced without using store-to-load forwarding, for example by delaying processing of the given younger non-predetermined-class load/store operation as discussed further below.

The predetermined-class store buffer may be separate from a non-predetermined-class store buffer used by the load/store processing circuitry to buffer store data for non-predetermined-class store operations. This has several advantages. Providing a dedicated store buffer for the predetermined class of store operations allows for simpler control logic to be used for the predetermined class of operations than is provided for the non-predetermined-class store operations, given the more relaxed ordering enforcement (e.g. a weak memory model) used for the predetermined class of instructions as discussed above. Also, separating the predetermined class of store operations into a separate buffer from the buffer used for non-predetermined-class store operations means that the entries of the non-predetermined-class store buffer supporting a more complex form of hazarding/forwarding logic are not used by the predetermined class of operations for which that more complex logic is unlikely to be needed. By conserving those entries with the more complex hazarding/forwarding circuit logic for the non-predetermined-class store operations that are more likely to benefit from this circuit logic, performance can be improved because, as the predetermined-class store operations do not consume an entry in the non-predetermined-class store buffer, it is less likely that a non-predetermined-class store operation is blocked because there is insufficient space in the non-predetermined-class store operation to handle that operation.

The load/store processing circuitry may support store-to-load forwarding from a non-predetermined-class store operation to a non-predetermined-class load operation using the non-predetermined-class store buffer.

The load/store processing circuitry may process the predetermined class of load/store operations using a separate load/store pipeline from a load/store pipeline used for non-predetermined-class load/store operations. Again, this can make the overall system more efficient in terms of performance and circuit area because there is no need for the predetermined class of load/store operations to be processed using more complex pipeline circuitry that supports functions not available for the predetermined class of load/store operations, conserving the slots that do support the more complex pipeline circuitry for those non-predetermined-class load/store operations.

The load/store processing circuitry may perform an address translation lookup for the predetermined class of load/store operations in a separate level-1 address translation cache from a level-1 address translation cache looked up for non-predetermined-class load/store operations. As mentioned above, it may be relatively likely that the predetermined class of load/store operations may access a different set of memory addresses compared to non-predetermined-class load/store operations, and so if both the predetermined-class load/store operations and the non-predetermined-class load/store operations shared the same level-one address translation cache, those operations may compete for limited address translation cache capacity and there may be a greater amount of cache thrashing causing loss of performance due to one of these classes of load/store operations causing eviction of address translation data used by the other of these classes of load/store operations. By providing a separate level-one address translation cache used for the predetermined class of load/store operations, conflict between addresses allocated to an address translation cache for the respective classes of load/store operations can be eliminated, improving performance for both classes of load/store operations.

The load/store processing circuitry may issue cache read/write requests triggered by the predetermined class of load/store operations to a further-level cache, bypassing a first-level cache used to handle cache read/write requests triggered by non-predetermined-class load/store operations. For example, the further-level cache could be a level 2 or level 3 cache of a cache hierarchy, which for non-predetermined-class load/store operations would be accessed following a miss in the first-level (level 1) cache. For some examples of the predetermined class of load/store operations (e.g. the stack access examples discussed below), it may be practical for the majority of instances of load operations of the predetermined class to be serviceable based on store-to-load forwarding from the predetermined-class store buffer, so that no access to the cache hierarchy is required in order to service those load operations of the predetermined class. For non-predetermined class load operations, it may be much more common that addresses of non-predetermined class load operations do not correspond to any address associated with the store data currently buffered in the non-predetermined-class store buffer, so that an access to the level 1 cache is required. As cache accesses for the predetermined class of load/store operations may be expected to be rare, the performance cost of directing those cache accesses to the level 2 cache (or further level of cache) rather than the level 1 cache may be relatively limited for the predetermined class of load/store operations, but this may have the advantage that those cache accesses triggered by the predetermined class of load/store operations do not use up any level 1 cache bandwidth that may be more beneficially used for non-predetermined-class load/store operations. Hence, by issuing cache read-write requests triggered by the predetermined class of load/store operations to a further-level cache, bypassing the first-level cache, this can improve performance for the non-predetermined-class load/store operations.

In response to the instruction decoder decoding the predetermined-class-load/store synchronization instruction, the load/store processing circuitry may trigger writeback, from the predetermined-class store buffer to a memory system, of store data associated with one or more older predetermined-class store operations occurring before the predetermined-class-load/store synchronization instruction in program order. By triggering writeback of buffered store data from the predetermined-class store buffer in response to the predetermined-class-load/store synchronization instruction, this can speed up the store data becoming visible to non-predetermined-class load/store operations, which is useful as the occurrence of the predetermined-class-load/store synchronization instruction is a hint that a subsequent non-predetermined-class load/store operation is likely to require data for an address previously specified by a predetermined-class store operation.

In response to the instruction decoder decoding the predetermined-class-load/store synchronization instruction, the load/store processing circuitry may cause processing of the hazarding younger non-predetermined-class load/store operation to be delayed to give time for store data of the hazarding older predetermined-class store operation to drain from the predetermined-class store buffer to a point at which the store data is observable by the hazarding younger non-predetermined-class load/store operation. This provides a technique for enforcing that the hazarding younger non-predetermined-class load/store operation gives a result which observes the result of the hazarding older predetermined-class store operation, which simplifies circuit implementation compared to an implementation which supports store-to-load forwarding from the hazarding older predetermined-class store operation to the hazarding younger predetermined-class load/store operation using a store buffer. As the occasions on which synchronization between an older predetermined-class store operation and a younger non-predetermined-class load/store operation is required are expected to be very rare, incurring an occasional delay in processing the younger non-predetermined-class load/store operation when synchronization is required can be acceptable and justifies the simpler approach of handling the hazard by delaying rather than forwarding.

The point at which the store data for the hazarding older predetermined-class store operation is observable to the hazarding younger non-predetermined-class load/store operation could for example be the further-level cache (e.g. level 2 cache or level 3 cache) as mentioned above. Alternatively, the point at which the store data is observable could be a cache write buffer associated with the further-level cache which buffers pending write requests awaiting servicing in the further-level cache, from which data could be returned to a subsequent load without actually needing to have been written yet to the cache storage itself. Such a cache write buffer is separate from the predetermined-class store buffer mentioned earlier.

In response to the instruction decoder decoding the predetermined-class-load/store synchronization instruction, the load/store processing circuitry may prevent store-to-load forwarding, to predetermined-class load operations, of store data from the predetermined-class store buffer associated with older predetermined-class store operations occurring before the predetermined-class-load/store synchronization instruction in program order. When the predetermined-class load/store synchronization instruction is executed, this indicates that there is likely to be some interaction between predetermined-class load/store operations and non-predetermined-class load/store operations, so it can no longer be guaranteed that, if a younger predetermined-class load/store operation specifies the same address as an older predetermined-class store operation (with no intervening predetermined-class load/store operations to that address between the older store and the younger load/store of the predetermined class) the store data of the older predetermined-class store operation can definitely be forwarded to the younger predetermined-class load/store operation, as there could have been an intervening non-predetermined-class store operation which could modify the data associated with the specified address in between the processing of the older predetermined-class store operation and the younger predetermined-class load/store operation. Providing circuit logic for detecting whether such an intervening non-predetermined-class store operation has occurred may be relatively complex (especially if the respective classes of load/stores are processed in different pipelines) and, given that the need for synchronization between predetermined-class load/store operations and non-predetermined-class load/stores is expected to be very rare, this logic may not be justified. It can be simpler (and hence, more efficient for circuit area and power consumption) that, in response to the predetermined-class-load/store synchronization instruction, store-to-load forwarding is disabled for the entries associated with the predetermined-class store operations that are older in program order than the predetermined-class-load/store synchronization instruction.

The predetermined class of load/store operations may comprise load/store operations triggered by decoding of a predetermined class of load/store instructions by the instruction decoder. Hence, instructions of a dedicated class can be identified by the instruction decoder (e.g. based on their instruction opcode or other parts of the instruction encoding, or based on other ISA features such as mode bits stored in a configuration register or the presence of a preceding prefix instruction which modifies the behaviour of the instruction) and then the instruction decoder can generate signals indicating whether corresponding load/store operations are to be processed as predetermined-class load/store operations or non-predetermined-class load/store operations.

The techniques discussed above could be applied to any class of load/store operations which are expected to be relatively unlikely to access addresses which overlap with the addresses to be accessed by other load/store operations not of the predetermined class. For example, the predetermined class of load/store operations could be a type of load/store operations which are to execute a dedicated control function using a region of memory which is not expected to be accessed in regular program code.

In one example, the predetermined class of load/store operations may comprise stack-accessing load/store operations to perform a stack pop/push operation, where a target address of the stack pop/push operation depends on a stack pointer. For example, the predetermined class of load/store operations may maintain some control data on a dedicated stack structure which is not expected to be likely to be used by other classes of load/store operations. By using a dedicated store buffer for the stack pop/push operations (rather than sharing the store buffer with other classes of load/store operations), it is more likely that the addresses of store data stored in the buffer will still be in the buffer when the corresponding stack pop operations are performed, so that it is relatively likely that many of the predetermined class of stack pop operations to be serviced without needing a cache access.

Predetermined-class store buffer prefetch circuitry may be provided to prefetch data to the predetermined-class store buffer for addresses predicted based on the stack pointer. This can further help to reduce the number of times when a stack pop operation requires data which is not already in the predetermined-class store buffer. Given the anticipated pattern in evolution of the stack pointer (incrementally advancing back and forth through the address space in response to the stack pop/push operations), prediction of what data will be needed for the stack pop operations next can be relatively accurate, so prefetching can greatly reducing the miss rate in the predetermined-class store buffer for the stack pop operations, and hence reduce the number of demand cache accesses needed for such stack pop operations. By bringing data predicted to be needed for a stack pop operation into the predetermined-class store buffer in advance of the time when the stack pop operation is actually requested, performance can be improved.

In one example, in response to a stack pop/push operation for a predetermined-class load/store operation which triggers the stack pointer to be updated to be within a predetermined distance of a cache line boundary, the predetermined-class store buffer prefetch circuitry may prefetch a subsequent cache line to the predetermined-class store buffer. As the stack pointer approaches a cache line boundary, it may be relatively likely that a subsequent cache line beyond that cache line boundary will be needed soon and so if it is not already within the predetermined-class store buffer it can be prefetched ready for when a subsequent stack pop or push operation will target an address in that subsequent cache line (note that even if the subsequent operation is a stack push operation, it may still be useful to prefetch the subsequent cache line as the stack push operation may need to merge its data into other parts of the subsequent cache line).

In some examples, in response to detecting that the stack pointer points to an address not having a valid entry in the predetermined-class store buffer, the predetermined-class store buffer prefetch circuitry may prefetch a cache line selected based on the stack pointer to the predetermined-class store buffer. For example, this can be useful if a stack pointer update occurs which is not triggered by a stack push or pop operation. On a more arbitrary stack pointer update (such as a change of the stack pointer on a conflict switch between two different software processes which may use different stack structures in memory) it can be useful to prefetch the cache line associated with the updated stack pointer into the predetermined-class store buffer so that some of the delay associated with a subsequent cache push/pop operation can be reduced compared to the case if the request for the cache line was only made once the subsequent cache push/pop operation of the predetermined class was actually processed.

In some examples, following one or more stack pop operations causing the stack pointer to pass beyond a range of addresses associated with a given entry of the predetermined-class store buffer, on eviction of the store data from the given entry of the predetermined-class store buffer, the load/store processing circuitry may suppress writeback of the store data from the given entry to a memory system. For the predetermined class of load/store operations (stack push/pop operations), once data pushed to the stack has been consumed by a subsequent stack pop operation it may not be needed again, and so once a given cache line has been left behind by the stack pointer following one or more stack pop operations, there may be little value to writing it back to the cache even if dirty. By suppressing writeback of store data from an entry associated with a range of addresses that has already been passed by the stack pointer following the updates to the stack pointer caused by one or more stack pop operations, this reduces the number of memory writes to the cache and downstream memory system, improving performance by conserving cache/memory bandwidth for other operations.

In one particular example, the predetermined class of load/store operations comprise load/store operations for accessing a guarded control stack (GCS) data structure for protecting return state information for returning from a function call or exception. Such GCS accessing load/store operations can be used as a defence measure against return oriented programming (ROP) attacks. A protected GCS data structure may be established which has at least one defence measure restricting the ability to write data in the GCS data structure, providing some additional protection relative to normal memory regions. As the GCS data structure may be managed as a stack (last-in first-out, LIFO) structure, the evolution of the stack pointer address can be predictable as discussed above and, as the pushes and pops to the data structure may be for the dedicated purpose of maintaining a set of protected return state information which is protected against tampering by an attacker, it is often desirable to avoid other non-GCS accessing load/store operations interacting with addresses mapped to the GCS data structure, so there is relatively little need for enforcing of ordering requirements and hazard checking between GCS load/store accesses and non-GCS load/store accesses. Therefore, the techniques discussed above can be particularly useful for applying when the predetermined class of load/store operations comprises the GCS load/store operations and the non-predetermined-class load/store operations comprise other operations not intended to access the GCS data structure.

The load/store processing circuitry may reject a non-predetermined-class store operation specifying a target address, in response to determining that a memory region corresponding to the target address is specified by memory attribute data as being a GCS region for storing the GCS data structure. By restricting the ability to write to the GCS region to GCS-accessing types of store operation of the predetermined class, other more general store instructions cannot tamper with the contents of the GCS data structure, providing a greater security guarantee for the protected return state information stored in the GCS data structure. This reduces the attack surface available for attackers to exploit when trying to mount ROP attacks.

Similarly, the load/store circuitry may reject a predetermined-class load/store operation specifying a target address, in response to determining that a memory region corresponding to the target address is specified by memory attribute data as being a region other than a GCS region for storing the GCS data structure. Hence, accesses to a memory region not designated as being for the GCS data structure may be rejected if the access is triggered by a GCS-accessing type of instruction. This avoids GCS-accessing types of instructions being misused to access regions of memory not intended for storing the GCS data structure, and gives confidence that a GCS read will be to a memory region which cannot have been modified by non-GCS-accessing instructions, to defend against ROP attacks.

The predetermined-class-load/store synchronization instruction may impose no additional ordering constraints between an earlier non-predetermined-class load/store instruction occurring before the predetermined-class-load/store synchronization instruction in program order and a later non-predetermined-class load/store instruction occurring after the predetermined-class-load/store synchronization instruction in program order. Hence, unlike more general types of memory barriers, the predetermined-class-load/store synchronization instruction may be an instruction specific to enforcing synchronization between a regular load/store operation not of the predetermined class and an older load/store operation of the predetermined class.

One specific example of the predetermined-class-load/store synchronization instruction described earlier is a GCS synchronization instruction, which is handled in the same way as the predetermined-class-load/store synchronization instruction described above, but for which the predetermined class of load/store operations are GCS load/store operations for accessing a GCS data structure for protecting return state information for returning from a function call or exception, and the non-predetermined class load/store operations comprise load/store operations other than the GCS load/store operations.

Hence, in one example load/store processing circuitry is provided to process load/store operations, including guarded-control-stack (GCS) load/store operations for accessing a GCS data structure for protecting return state information for returning from a function call or exception. An instruction decoder is responsive to a GCS synchronization instruction to control the load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation. In the absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the load/store processing circuitry is configured to permit the given younger non-GCS load/store operation to yield a result which fails to observe a result of the given older GCS store operation.

By supporting, in an instruction set architecture supported by the instruction decoder, an instruction which can be used to signal the (relatively rare) cases when synchronization between GCS and non-GCS accesses is needed, this gives greater flexibility in design choices for micro-architectural hardware designers than if GCS accesses were by definition assumed to be ordered relative to other memory accesses in the same way as any other kind of memory access. For example, by pushing the onus onto the software developer to explicitly flag (using the GCS synchronization instruction) when non-GCS accesses need to observe the effects of older GCS accesses, this means a hardware designer can (although is not obliged to) provide a simpler processing path for GCS accesses, separate from the path used for the non-GCS accesses, with a more basic form of hazarding between GCS and non-GCS accesses that is not required to be invoked unless the GCS synchronization instruction is executed.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 (an example of processing circuitry) includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU), which is an example of memory management circuitry, 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and access permissions which govern, for example, whether a given process executing on the pipeline is allowed to read or write data or execute instructions from a given memory region. The MMU 28 may have circuitry to request memory accesses during page table walks, when the page table structures are traversed to locate the page table entry corresponding to a required address.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness. While FIG. 1 shows a single processor core with access to memory 34, the apparatus 2 also could have one or more further processor cores sharing access to the memory 34 with each core having respective caches 8, 30, 32.

Figure 2:
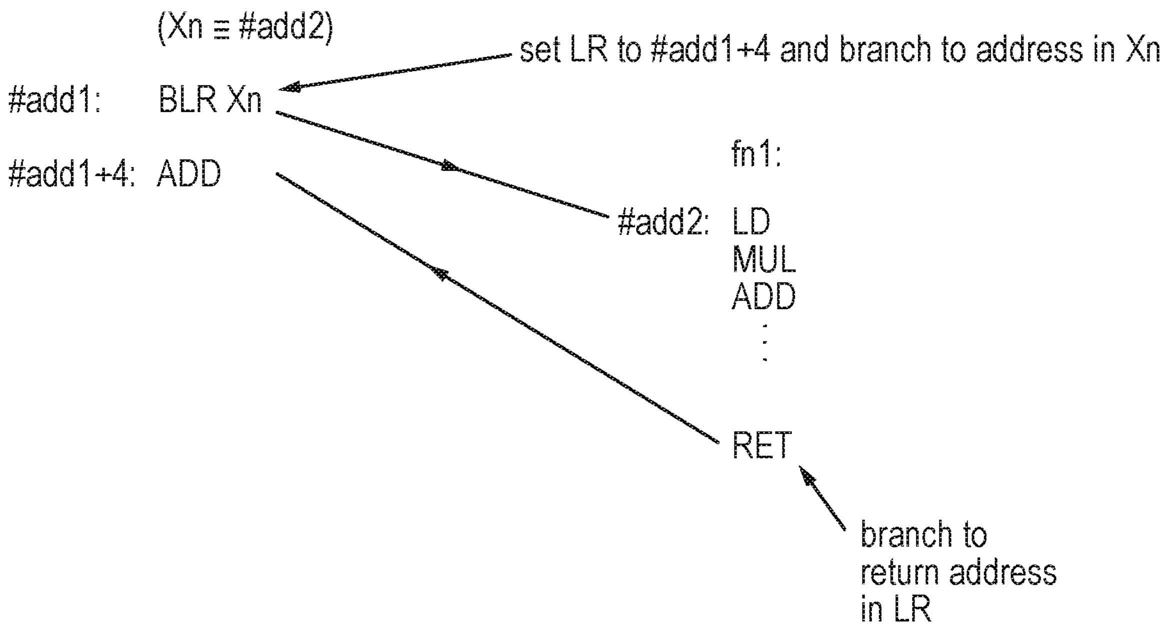
FIG. 2 illustrates an example of the function call.

FIG. 2 illustrates an example of calling a function (labelled fn1 for ease of reference) and returning from the function. A function (also known as a procedure) is a sequence of instructions that can be called from another part of a program and which when complete returns processing to the part of the program flow from which the function was called. The same function can be called from a number of different locations in the program, and so a function return address is stored on calling the function, so that the function return can distinguish which address program flow should be returned to.

For example, as shown in FIG. 2, a branch with link instruction BLR may be executed at the point (represented by address #add1) where the function is to be called, to cause program flow to branch to an instruction at a branch target address #add2 specified using operands of the branch with link instruction. The branch with link instruction also causes the processing circuitry to set a link register (a designated register used for tracking a function return address) to an address of the next instruction after the branch with link instruction (in this example, the function return address is #add1+4). After the branch has been taken, a number of instructions (e.g. LD, MUL, ADD, etc.) are executed within the function code and when the function is complete a return branch instruction RET is executed which causes a branch to the instruction indicated by the return address stored in the link register.

If no other functions are called from within fn1, and no exception occurs before the return branch at the end of fn1 is reached, then the address in the link register should still be the same as set when fn1 was called.

However, often a first function fn1 called by background code may itself call a further function (fn2, say) in a nested manner, and in this case the function call to fn2 would overwrite the return address stored in the link register, and so prior to calling that further function, the function code of the first function fn1 should include an instruction to save the return address from the link register to a data structure in memory (e.g. a stack structure, operated in a last-in-first-out (LIFO) manner), and after returning from fn2 the function code of fn1 should restore the return address to the link register before executing the return branch. The responsibility for saving and restoring function return state such as the return address would typically lie with the software (there may be no architecturally-enforced hardware mechanism for saving the return address).

However, while the function return address is stored in memory, it may be vulnerable to an attacker modifying that data, for example using another thread executing on another processor core, or by interrupting the called function and executing other code in the meantime which overwrites the return address stored in memory. Alternatively, the attacker could execute some instructions which aim to modify the address operands of the instruction which restores the return address from memory to a register, so that the data loaded from memory is not the same as the return address which was originally saved to memory before calling a nested function. If the attacker can cause the return branch to branch to a point in the program flow other than the instruction after the function calling branch, the attacker may be able to cause the software to behave incorrectly, and may be able to circumvent certain security protections or cause undesired operations to be performed.

A function call is one example of an operation which generates return state information providing information about the state to which the processing circuitry is to be restored at a later time. Another scenario when return state information may be captured may be when an exception is taken, at which point exception handling circuitry provided in hardware, or a software exception handler, may capture exception return state information, such as an exception return address indicating an address of an instruction to be executed after returning from handling an exception, and/or saved processor state information indicating a mode or execution state in which the processor is to execute after returning from the exception. For example, the saved processor state information could indicate which exception level the exception was taken from, as well as other information about the operating state of the processor at the time the exception was taken. As with function calls, exceptions may be nested and so exception return state captured for one exception can be saved to memory (either automatically in hardware, or by a software exception handler) when another exception is taken, and so may be vulnerable to tampering by an attacker while it is stored in memory. These types of attacks may be referred to as return oriented programming (ROP) attacks. It can be desirable to provide an architectural countermeasure against such attacks.

Figure 3:
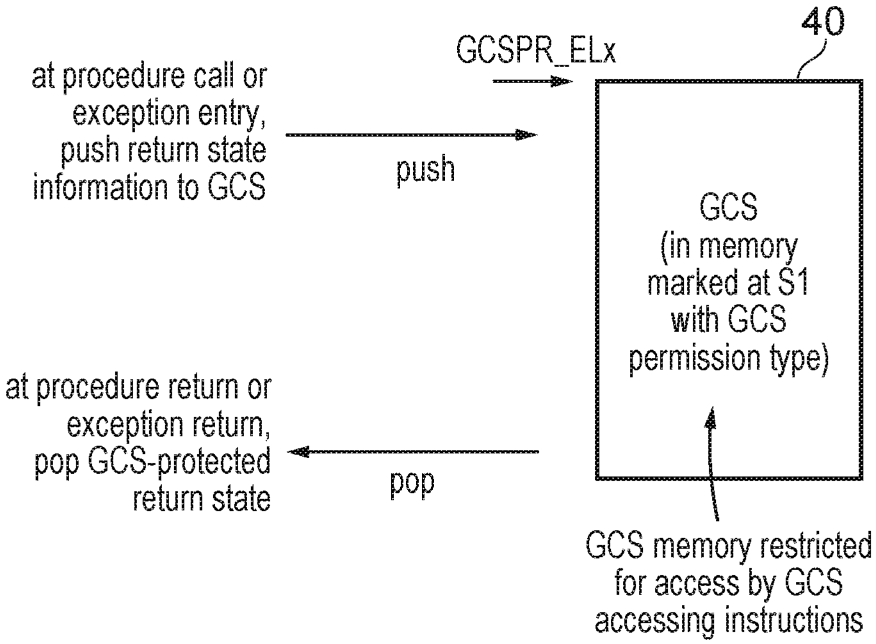
FIG. 3 illustrates an example of guarded control stack (GCS) push and pop operations.

FIG. 3 illustrates an approach for protecting against ROP attacks using a protected data structure 40 in memory called a “guarded control stack” (GCS). The location of the GCS data structure within the memory address space may be selected by software, but the hardware provides architectural features designed to protect the GCS data structure against tampering by a malicious attacker.

The registers 14 may include control registers including one or more guarded-control-stack-pointer (GCS pointer) registers for storing a stack pointer indicating an address on the GCS data structure. In some examples, the GCS pointer register may be a banked set of registers, provided separately for at least two execution states (e.g. exception levels), to enable software operating at different execution states to reference different GCS structures within memory without needing to reprogram a shared stack pointer register after each transition of execution state. Other examples could use a single GCS pointer register and software could update the stack pointer stored in the GCS pointer register on a transition between execution states.

As shown in FIG. 3, the GCS data structure 40 is stored in a region of memory designated as being a GCS region of memory by a memory attribute specified, either directly or indirectly, by an associated page table entry of the page tables used by the memory management unit (MMU) 28 for controlling address translation and access permission checks. The GCS region attribute could be specified either directly within the encoding of the corresponding page table entry for a memory region comprising at least part of the GCS data structure, or could be referenced indirectly within a register referenced by that page table entry.

When a memory region is identified as being the GCS region, then write access to that region is restricted to write requests triggered by the processing circuitry 16 when executing a certain subset of GCS-accessing instructions. General purpose store instructions used by software for general store operations not intended to access the GCS structure are not considered one of the restricted subset of GCS-accessing instructions. The MMU 28 may still permit the GCS structure to be read using a general purpose load instruction which causes issuing of a read request which is not a GCS memory access request. When a memory access request is requesting access to a GCS region, the request is a write request, and the request is not a GCS memory access request triggered by one of the restricted subset of GCS-accessing instructions, then the memory access request is rejected and the fault is signalled. The subset of GCS-accessing instructions may include at least a GCS push instruction which causes return state information (such as the function return address from the link register, or an exception return address or saved processor state captured on taking an exception) to be pushed to a location on the GCS structure determined using the stack pointer indicated in the GCS pointer register 58. The GCS push instruction also causes the stack pointer to be advanced by an amount depending on the size of the stack frame pushed to the GCS (e.g. by incrementing the stack pointer by the size of the stack frame if the GCS is managed as an ascending stack, or by decrementing the stack pointer by the size of the stack frame if the GCS is managed as a descending stack). GCS-accessing instructions may also include at least one form of GCS pop instruction which pops protected return information from the GCS structure. As well as returning the return information popped from the stack, a GCS pop instruction also causes the stack pointer to be adjusted in the opposite direction to the direction in which the stack pointer is adjusted for a GCS push instruction (e.g. by decrementing the stack pointer by the size of the stack frame if the GCS is managed as an ascending stack, or by incrementing the stack pointer by the size of the stack frame if the GCS is managed as a descending stack)

The GCS-accessing instructions may not be allowed to access memory regions which are not designated by the page table attributes as the GCS region type. Hence, a fault can be signalled if an attempt to perform a GCS access is made when the memory region targeted by the access is not marked as the GCS region type. By prohibiting use of GCS-accessing instructions for accessing non-GCS regions, this discourages programmers from using the GCS-accessing instructions unless it is really intended to be a GCS access, to reduce the attack surface available to an attacker. Also, this gives confidence that the data accessed by a GCS pop instruction is not able to be modified by non-GCS instructions.

The GCS structure is separate from any data structure used by the software to maintain saved return state information within memory to handle nesting of function calls or exceptions. Hence, the GCS structure is not intended to eliminate the need for software itself to track saving and restoring of return state information when function calls or exceptions are nested (the software-triggered saving of return state may continue in the same way as on a processor not supporting the GCS-protected architectural measures discussed above). Instead, the GCS structure provides a region of protected memory which is protected against tampering by compromised program code, which can be used to provide information for verifying the return state information intended to be used by the software to return from processing of the function call or an exception.

In some implementations the GCS pop instruction, which causes protected return state information to be popped from the GCS structure, may also cause the processing circuitry 16 to compare the popped return state with current return state information stored in registers (e.g. a link register for a function return, or an exception return address register and/or saved processor state register for an exception return), and to signal a fault if there is a mismatch between the return state information popped from the GCS structure 40 and the intended return state information which software intends to use for a function/exception return. Hence, software can be protected against tampering by including instances of the GCS push and GCS pop instruction within the program code to be executed around a function call/return or exception entry/return.

Other implementations may define a separate instruction for verifying whether the intended return state information is valid, separate from the instruction which pops return state information from the GCS structure 40.

Alternatively, the GCS pop instruction could pop the protected return state from the GCS directly to one or more registers used to specify the return state for an exception return or function return (or could be combined with the exception/function return instruction to both pop the protected return state and use that state for controlling an exception/function return), in which case it is not essential to carry out a step of verifying whether software-provided intended return state information is valid, as in such an implementation the GCS-protected return state is used directly to control the exception/function return. For example, for GCS protection of a function return address, the function return address could be popped directly to the link register replacing any software-managed function return address that software may have placed there based on its own managed stack structure.

Also, other types of GCS accessing instructions could also be supported. Some instructions, which have other functions in a mode where use of the GCS is disabled, could cause the processing circuitry 16 to perform additional functions (such as additional GCS-mode-specific security checks) when executed when the GCS mode is enabled (control state in control registers may control whether the GCS mode is enabled).

In general, by providing architectural support for defining a GCS memory region type for use for the GCS structure 40, and restricting write access to the GCS region type to a limited subset of GCS accessing instructions (which may not be allowed to access memory regions other than the GCS region type), this reduces the attack surface available for an attacker to try to tamper with protected return state information stored on the GCS structure 40.

GCS accessing instructions, such as the GCS push instruction and GCS pop instruction described above, are an example of instructions which trigger a predetermined class of load/store operations for which it may be beneficial to handle this class of load/store operation separately from other types of load/store operations. The GCS push/pop instructions may introduce additional memory read/write operations as part of each function call/return that would not be required in the absence of support for the GCS. For some types of processor core, the overhead of these additional memory reads and writes can become prohibitive, both in terms of performance and in terms of power consumption, if handled as normal load/store operations. The GCS load/store operations are relatively unlikely to access the same addresses as regular load/store operations, and so often the more complex hazarding and ordering control logic used to maintain ordering between regular load/store operations and circuitry for supporting store-to-load forwarding to/from regular load/store operations may not be necessary for handling the GCS load/store operations. The vast majority of GCS load operations may only access addresses which have previously been stored to by a GCS store operation, but are not accessed by other classes of load/stores.

A small, weakly-ordered, dedicated pipeline is proposed, coupled with a GCS store (synchronization) buffer that can significantly reduce the overhead of implementing the GCS accesses, by handling the majority of GCS memory reads/writes without accessing regular data-side caches, and without utilising (and contending for bandwidth on) the normal load/store pipeline and memory paths.

Occasionally, a programmer or compiler may wish regular load/store operations to access an address previously written to by a GCS store (push) operation. For example, the sequence of function return state pushed to the GCS by a series of GCS store (push) operations may provide call path information which can be useful for understanding the path of program flow taken through a program, and so the software may wish to copy function return information from the GCS data structure to another region of memory to allow for analysis of the program flow behaviour. In this case, there may be a need for interaction between the regular load/store operations and the GCS load/store operations. However, for the majority of instances of executing GCS load/store operations there is no need for such interaction with regular load/store operations, and so providing the same circuit logic for controlling hazarding, ordering enforcement and store-to-load forwarding may not be justified for the GCS load/store operations.

Therefore, in the technique discussed below, a dedicated GCS store buffer is provided (as a micro-architectural buffer implemented in hardware circuitry, not as a data structure maintained in memory) separate from the store buffer used for regular store operations. In the absence of a GCS synchronization instruction occurring in program order between an older GCS store operation and a younger non-GCS load/store operation, there is no need for the younger non-GCS load/store operation to provide a result which observes the result of the older GCS store operation. Hence, the younger non-GCS load/store operation can be incoherent with respect to the older GCS store operation, so even if they specify the same addresses the younger non-GCS load/store operation can obtain a data value which was associated with the address prior to execution of the older GCS store operation. This simplifies the control logic by avoiding the need to hazard or forward data between GCS store operations and non-GCS load/store operations. When a GCS synchronization instruction is executed, signalling that there is a requirement for younger non-GCS load/store operations to observe a result of any older GCS store operation to an overlapping address which precedes the GCS synchronization instruction in program order, then addresses associated with data in the GCS store buffer are made available for hazarding with addresses of younger non-GCS load/store operations, but as this scenario is expected to be rare, it is acceptable to use a lower cost circuit implementation for this hazarding which may be less performance-efficient but can be cheaper to implement (e.g. dealing with any hazards by delaying the younger non-GCS load/store operation until the store data associated with the older GCS store operation has reached the cache, rather than implementing store-to-load forwarding from a GCS store operation to a non-GCS load/store operation). Hence, by supporting, as part of the instruction set architecture supported by the instruction decoder 10 and processing circuitry 16, the GCS synchronization instruction, this helps to support the option of more power-efficient implementations while still allowing software, when required, to enforce that a given non-GCS load/store operation sees the result of an earlier GCS store operation.

Figure 4:
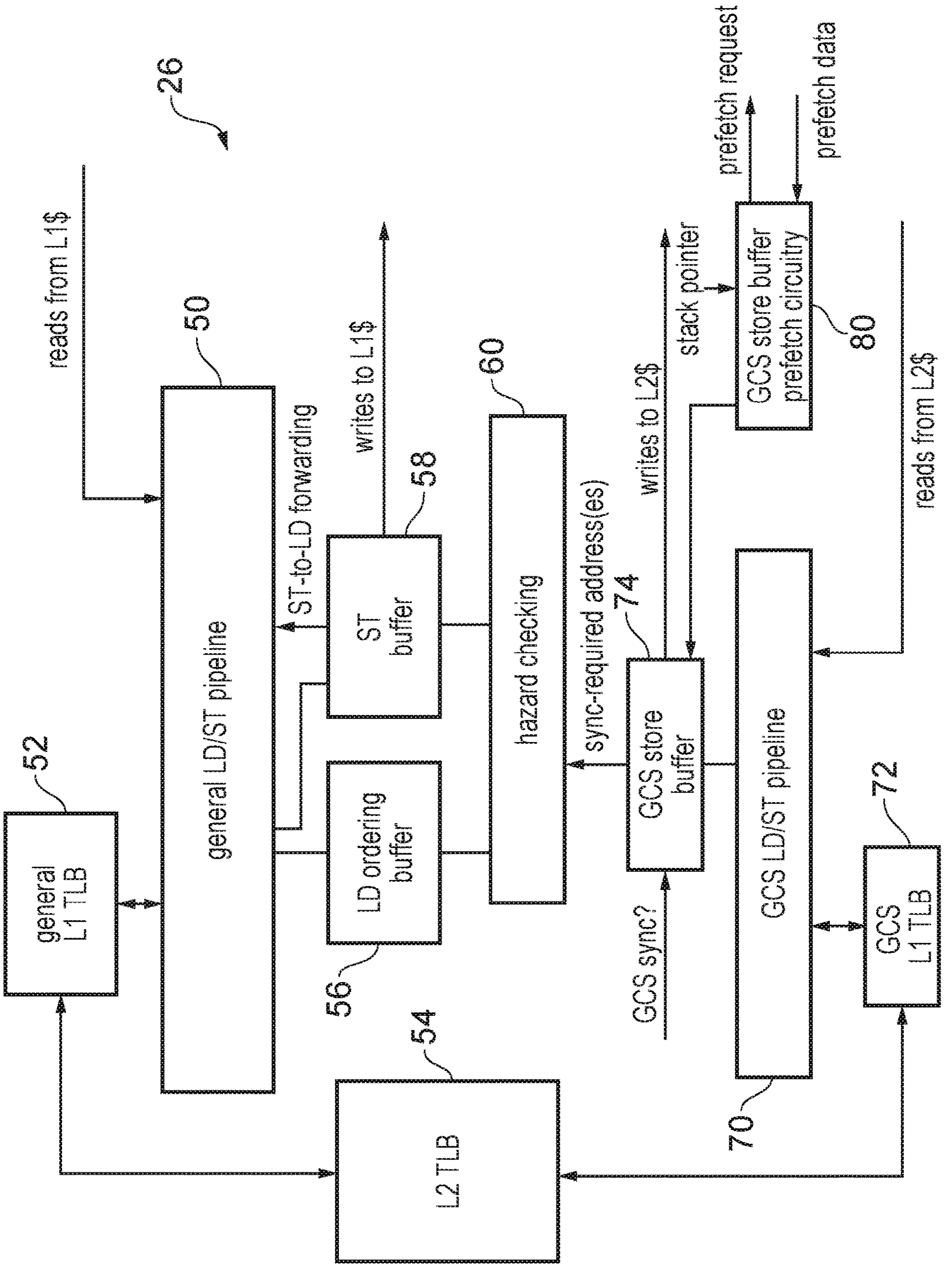
FIG. 4 illustrates an example of load/store processing circuitry.

FIG. 4 illustrates an example of a portion of the load/store unit 26 (an example of load/store processing circuitry). The load/store unit 26 has a general load/store pipeline 50 for processing load/store operations other than the GCS load/store operations. The general load/store pipeline 50 has a number of pipeline stages for controlling different aspects of the processing of a load or store operation, such as address generation, address translation and page table attribute lookup, ordering/hazarding checks and cache read/write request processing. Any known load/store pipeline design may be used for the general load/store pipeline. The general load/store pipeline looks up virtual addresses of load/store operations in a general level 1 (L1) TLB (translation lookaside buffer) 52, which is a cache of address translation information derived from page tables stored in memory. If the looked up virtual address hits in the general L1 TLB 52, then the corresponding address translation information (including an address mapping and/or memory access control attributes such as the attributes indicating whether the address corresponds to GCS region as discussed above) is returned the pipeline to use for controlling processing of the corresponding load/store operation. If the looked up virtual address misses in the general level 1 TLB 52 then a further lookup of the address is performed in a level 2 (L2) TLB 54. If the required information is found the L2 TLB 54 than it is returned to the pipeline 50 and may also be allocated into the general L1 TLB 52, while if the address misses in the L2 TLB 54 then optionally a further lookup may be performed in a further TLB structure, and if the address misses in all of the hierarchy of TLBs provided then a page table walk is performed to trigger a series of memory accesses for traversing one or more levels of page tables to obtain the required address translation information.

Having obtained the relevant address translation information, any memory attributes are checked and a fault is signalled if the memory attributes indicate that the load/store operation cannot be processed (e.g. if the memory region being accessed is of a region type which is not allowed to be accessed by the current request). A fault can also be triggered if no address translation information was defined in the page tables for the accessed memory region. If the memory attributes indicate that the current load/store operation is allowed, the operation proceeds based on a physical address translated from the virtual address based on the address translation mapping returned in the TLB lookup or returned by a page table walk.

For load operations, an address associated with the load is allocated to a load ordering buffer 56 which is used to enforce ordering between load/store operations. For example, the load ordering buffer 56 may be used to detect read-after-read (RAR) hazards or read-after-write (RAW) hazards. For store operations, the address of the store operation is allocated an entry in a (non-GCS) store buffer 58 and store data (read from the registers 14 or forwarded from an earlier instruction once computed) is written into the store buffer entry once the data is available. Hazard checking circuitry 60 compares addresses of loads processed by the load/store pipeline 50 with the addresses of store data buffered in the store buffer 58 so that, when a younger load accesses an address range which overlaps with at least part of the address range accessed by an older store having an entry in the store buffer 58, the relevant store data can be forwarded from the store buffer 58 to the load operation so that the load operation can be serviced without needing to issue a request to read that data from the cache 30, 32. Any known store-to-load forwarding technique may be used to control the forwarding of store data from non-GCS stores to non-GCS loads.

Once the store data for a given store is available and there is sufficient bandwidth available to issue a write request to the L1 cache 30, store data for a pending store operation is transferred from the store buffer 58 to the cache 30. For load operations which cannot be serviced based on store-to-load forwarding alone, a read request is issued by the general load/store pipeline 50 to request that data associated with the address of the load is read from the L1 cache 30. The read/write requests issued by the load/store pipeline 50 to the L1 cache 30 may, if missing in the L1 cache 30, be serviced based on accesses to the L2 cache 32, a further level of cache (if provided), or main memory 34 as required.

The load/store unit 26 also includes a GCS load/store pipeline 70 which is separate from the pipeline 50 handling non-GCS load/store operations. This allows the circuitry used for handling the GCS load/store operations to be simpler and avoids the need to incur circuit area and power in providing more complex hazard checking functions which are very unlikely to be needed for GCS load/store operations. This also avoids the GCS load/store operations consuming slots within the general load/store pipeline 50, load ordering buffer 56, store buffer 58 and L1 cache access paths which could otherwise be used for non-GCS load/store operations, improving performance.

The GCS load/store pipeline 70 performs its address lookups in a GCS L1 TLB 72 which is separate from the general L1 TLB 52 used by the general load/store pipelines 50. The GCS L1 TLB 72 may have a smaller cache capacity (capable of caching address translation information for fewer addresses) than the general L1 TLB 52. It can be useful to provide a dedicated L1 TLB 72 for GCS accesses, because the GCS accesses may typically access a different subset of addresses to regular load/store operations and so separating the address translation cache capacity for the two classes of operations can help to reduce conflicts for address translation cache allocations, hence improving performance. If the address translation lookup for an address of a GCS load/store operation misses in the GCS L1 TLB 72 then a lookup is performed in the shared L2 TLB 54 which may be the same structure that is looked up on misses in the general L1 TLB 52 in response to general non-GCS load/store operations. Similarly, page table walk control circuitry (for walking page table structures to obtain address translation information which was not found in any of the levels of TLB) may be shared between the general load/store operations and the GCS load/store operations. The various TLB structures 52, 54, 72 can be regarded as part of the MMU 28 shown in FIG. 1.

The GCS load/store pipeline 70 also has access to a GCS store buffer 74 which is a micro-architectural buffer implemented in hardware, and which is separate from the non-GCS store buffer 58 used by the general load/store pipeline 50. The capacity of the GCS store buffer 74 may be smaller than the capacity of the store buffer 58, e.g. holding store data for as few as one or two cache lines. The GCS load/store pipeline 70 supports store-to-load forwarding using the GCS store buffer 74 between GCS store operations and GCS load operations, but not between GCS store operations and non-GCS load operations. Similarly, it is not possible to perform store-to-load forwarding of store data associated with a non-GCS store operation to a GCS load operation. Also, for the majority of entries in the GCS store buffer 74, no hazard checking of those addresses with respect to addresses processed by the general load/store pipeline 50 is required.

When a GCS synchronization instruction is executed, the GCS store buffer 74 marks any pending valid entries (associated with GCS stores that precede the GCS synchronization instruction in program order) as requiring synchronization, and then the addresses associated with those entries are made available to the hazard checking circuitry 60 to compare with addresses of younger non-GCS load/store operations tracked by the load ordering buffer 56 and store buffer 58. If a hazard is detected between a synchronization-required entry of the GCS store buffer 74 and a younger non-GCS load/store operation to an overlapping address, then the non-GCS load/store operation is delayed until the store data associated with the synchronization-required entry has drained from the GCS store buffer 74 to a point at which it can be observed by the younger non-GCS load/store operation (in practice, this point may be the cache hierarchy, although it could also be an intervening buffer such as a buffer local to the cache which queues write requests issued to the cache). To reduce the delay until the store data associated with a synchronization-required entry of the GCS store buffer 74 is visible to younger non-GCS stores, the GCS synchronization instruction may also trigger the GCS store buffer 74 to start writing back the store data of its synchronization-required entries to the cache hierarchy 30, 32.

Although it would be possible for cache read/write requests initiated by the GCS load/store pipeline 70 to be directed to the L1 cache 30, this would cause such cache read/write requests to contend for cache access bandwidth with requests made by the general load/store pipeline 50. In practice, unless an extremely large number of nested function calls are made, the GCS stack pointer will be likely to vary only within a few cache lines as GCS push/pop operations are performed, so it is likely that a large fraction of GCS load operations can be serviced solely based on store-to-load forwarding from the GCS store buffer 74 and do not require access to the cache. This can be particularly the case if GCS store buffer prefetch circuitry 80 is provided which manages prefetching of data into the GCS store buffer 74 in advance of explicitly being requested based on the GCS load/store operation. For example, as a series of GCS push/pop operations causes the GCS stack pointer to near a cache line boundary, the GCS store buffer prefetch circuitry 80 can issue a prefetch request to fetch in the next cache line after the boundary, making it likely that once further GCS push/pop operations are executed, they can be serviced from an existing entry of the GCS store buffer and do not need a cache access. If there is a more arbitrary GCS stack pointer update operation to update the GCS stack pointer in a manner other than an incremental update in response to a push/pop operation, then the fact that the GCS stack pointer now does not correspond to any of the cache lines already allocated to the GCS store buffer 74 could be detected by the prefetch circuitry 80 and used to trigger a prefetch request to prefetching a cache line associated with the new value of the GCS stack pointer after the update. Hence, it is relatively unlikely that a GCS load/store would need a cache access.

Therefore, to reduce contention for level 1 cache accesses which are more likely to benefit performance for the general load/stores rather than the GCS load/stores, then on those rare occasions when a GCS load/store operation does trigger a demand cache access, the corresponding cache read/write request can be issued to the level 2 cache 32, bypassing the level 1 cache 30. Similarly, the prefetch requests issued by the GCS store buffer prefetch circuitry 80 may be issued to the level 2 cache 32 and bypass level 1 cache 30. This can help to improve performance for the general load/store operations which can benefit from faster access to the level 1 cache 30 as there is less contention for the level 1 cache bandwidth.

If allocation of a new entry in the GCS store buffer 74 requires eviction of an existing entry, it is not always required to write back the data associated with the evicted entry to memory, even if that data is dirty. If the data in the evicted entry has already been consumed by GCS pop operation then it will no longer be required and so can simply be discarded and the corresponding writeback to the L2 cache 32 can be eliminated.

Hence, in summary, the implementation proposed in FIG. 4 provides a small GCS pipeline 70 with a dedicated L1 TLB 72, and a physically addressed micro-architectural GCS store buffer 74. The memory reads and writes generated as part of the GCS push/pop instructions insert new load/store operations into the GCS pipeline 70. The GCS pipeline 70 and GCS store buffer 74 are not connected to the L1 cache 30, non-GCS store buffer 58, or similar structures, and instead connect to the L2 cache 32. The micro-architectural GCS store buffer 74 is capable of holding, in one example, one or two cache lines worth of data. When the GCS pointer points beyond what is currently available in the microarchitectural GCS buffer 74, the GCS store buffer prefetch circuitry 80 uses an Input/Output-coherent read to prefetch data into the GCS store buffer 74. The prefetch circuitry 80 also prefetches the next cache line when the GCS pointer approaches a cache line boundary, significantly reducing the likelihood of a GCS buffer miss and associated performance penalty.

When a GCS push instruction is executed, its associated memory write is merged into the relevant (part-)cache line in the GCS buffer. Similarly, on a GCS pop, the associated memory read simply reads from the relevant entry of the GCS buffer. Hence, the micro-architectural GCS buffer behaves like a merging store buffer. However, if a sequence of returns causes an entire cache line of data that is present in the GCS buffer to be outside the view of the current GCS pointer (i.e. the GCS pointer has passed beyond the address associated with that cache line), the cache line is not written back, hence reducing the number of memory writes to downstream memory. If the GCS store buffer 74 needs to evict an existing entry that is still within the GCS pointer, the cache line is written using an I/O-coherent write into the L2 cache 34.

Unlike the non-GCS store buffer 58, the micro-architectural GCS store buffer 74 is not directly readable or writeable via regular (non-GCS) load/store operations. Instead, to make it visible it is first synchronised using a GCS synchronization instruction. The GCS synchronization instruction causes the GCS store buffer 74 to mark entries in the GCS store buffer as "synced"—these "synced" entries can then no longer be read for GCS load operations triggered by GCS pop instructions. The addresses of "synced" entries become visible to normal loads and stores to hazard against by the hazard checking circuitry 60. The GCS store buffer 74 triggers writes to the L2 cache 32 for "synced" entries irrespective of whether those entries need to be evicted—hence decoding of the GCS synchronization instruction by the instruction decoder 10 causes the GCS store buffer 74 to automatically start draining store data from the synced entries into the L2 cache to become visible. Normal loads and stores hazard against "synced" entries (the normal load/stores are delayed until the corresponding store data has drained out of the microarchitectural GCS buffer and into the L2 cache). Once the entries have drained out, the loads and stores can access the cache line via a normal L1 cache refill (which may trigger a linefill from the updated data in the L2 cache which was drained from the GCS store buffer 74).

Hence, this implementation provides the following advantages:

- No additional L1 data cache pressure or load/store bandwidth on the general load/store pipeline 50 caused by introducing the GCS load/store operations.
- Reduced number of cache writebacks (by eliding writebacks for data that is out of the view of the architectural GCS pointer/buffer).
- Reduced power from not using more expensive regular load/store paths, address generation and L1 TLBs.

Hence, FIG. 4 shows an example of load/store processing circuitry 26 that can provide for more efficient processing both for a predetermined class of load/store operations and for non-predetermined-class load/store operations other than the predetermined class, which can be useful when the predetermined class of load/store operations is relatively unlikely to access addresses which overlap with the addresses accessed by the non-predetermined-class load/store operations. In the example of FIG. 4, the predetermined class of load/store operations is the GCS load/store operations triggered by a GCS push or pop instruction, but similar techniques could also be used for other classes of load/store operations.

Also, while in the example of FIG. 4 all other load/store operations, other than the predetermined class of GCS load/store operations, are processed using the general load/store pipeline 50, other examples could also have a dedicated pipeline for a third class of load/store operations, separate from the pipelines used for the GCS load/store operations and the other general load/store operations. This may be useful if there is a further class of load/store operations for which a dedicated control function is desired. Therefore, it is not essential that all other load/store operations not of the predetermined class are processed using the general load/store pipeline 50.

Figure 5:
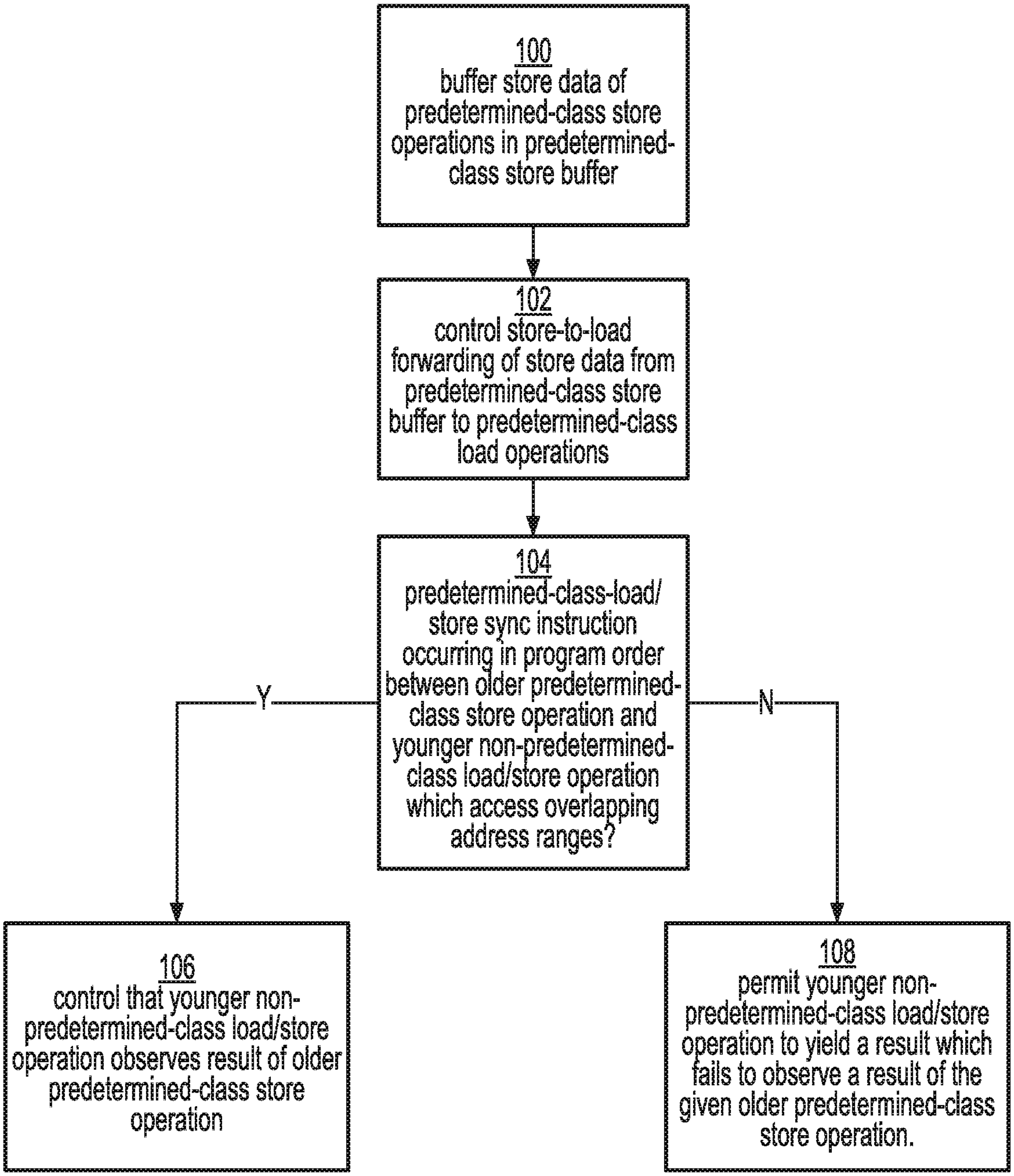
FIG. 5 illustrates a method of processing load/store operations.

FIG. 5 is a flow diagram illustrating a method of processing a predetermined class of load/store operations, such as the GCS load/store operations mentioned above. At step 100, the load/store processing circuitry 26 buffers store data associated with predetermined-class store operations in the predetermined-class store buffer 74. At step 102, the load/store processing circuitry 26 controls store-to-load forwarding of store data from the predetermined-class store buffer 74 to predetermined-class load operations. That is, a predetermined-class load operation is provided with at least a portion of store data written to an entry of the predetermined-class store buffer 74 for an older (in program order) predetermined-class store operation specifying a corresponding address which relates to an address range overlapping with the address range specified by the predetermined-class load operation. Store-to-load forwarding from the predetermined-class store buffer 74 is not supported between a predetermined-class store operation processed by the GCS load/store pipeline 70 and a non-predetermined class load/store operation being processed by the general load/store pipeline 50.

At step 104, the load/store processing circuitry 26 determines whether the instruction decoder has decoded a predetermined-class-load/store synchronization instruction (e.g. the GCS synchronization instruction described above) occurring in program order between an older predetermined-class store operation and a younger non-predetermined-class load/store operation which accesses an address range overlapping with the address range accessed by the older predetermined-class store operation. If there has been such an intervening predetermined-class-load/store synchronization instruction, then at step 106 the load/store processing circuitry 26 controls the processing of the younger non-predetermined-class load/store operation to ensure that it observes the results of the older predetermined-class store operation. For example, this can be achieved by delaying the processing of the younger non-predetermined-class load/store operation until the store data of the older predetermined-class store operation has reached the cache (e.g. L2 cache 32). If there has not been any intervening predetermined-class-load/store synchronization instruction between the older predetermined-class store operation and the younger non-predetermined-class load/store operation, then at step 108 the younger non-predetermined class load/store operation is permitted to yield a result which fails to observe a result of the given older predetermined-class store operation. For example, it may be possible that, as no hazard is detected between the younger non-predetermined-class load/store operation and the older predetermined-class store operation even if they correspond to the same address, the younger operation could return a value associated with that address prior to an update made by the older predetermined-class store operation. This is architecturally correct in the absence of any intervening synchronization instruction. Effectively, the predetermined-task-load/store synchronization instruction acts as a hint provided to the hardware, hinting that the hardware needs to do some hazard checking between load/store operations of the predetermined class and other load/store operations. The responsibility is passed to the programmer or the compiler to include the synchronization instruction to ensure this synchronization is performed in the cases when interaction between the predetermined class of load/store operations and other load/stores is expected. In the absence of the synchronization instruction, a more relaxed (weak memory ordering) approach can be taken, to allow for cheaper circuit implementation with lower power cost in handling the predetermined class of load/store operations.

Figure 6:
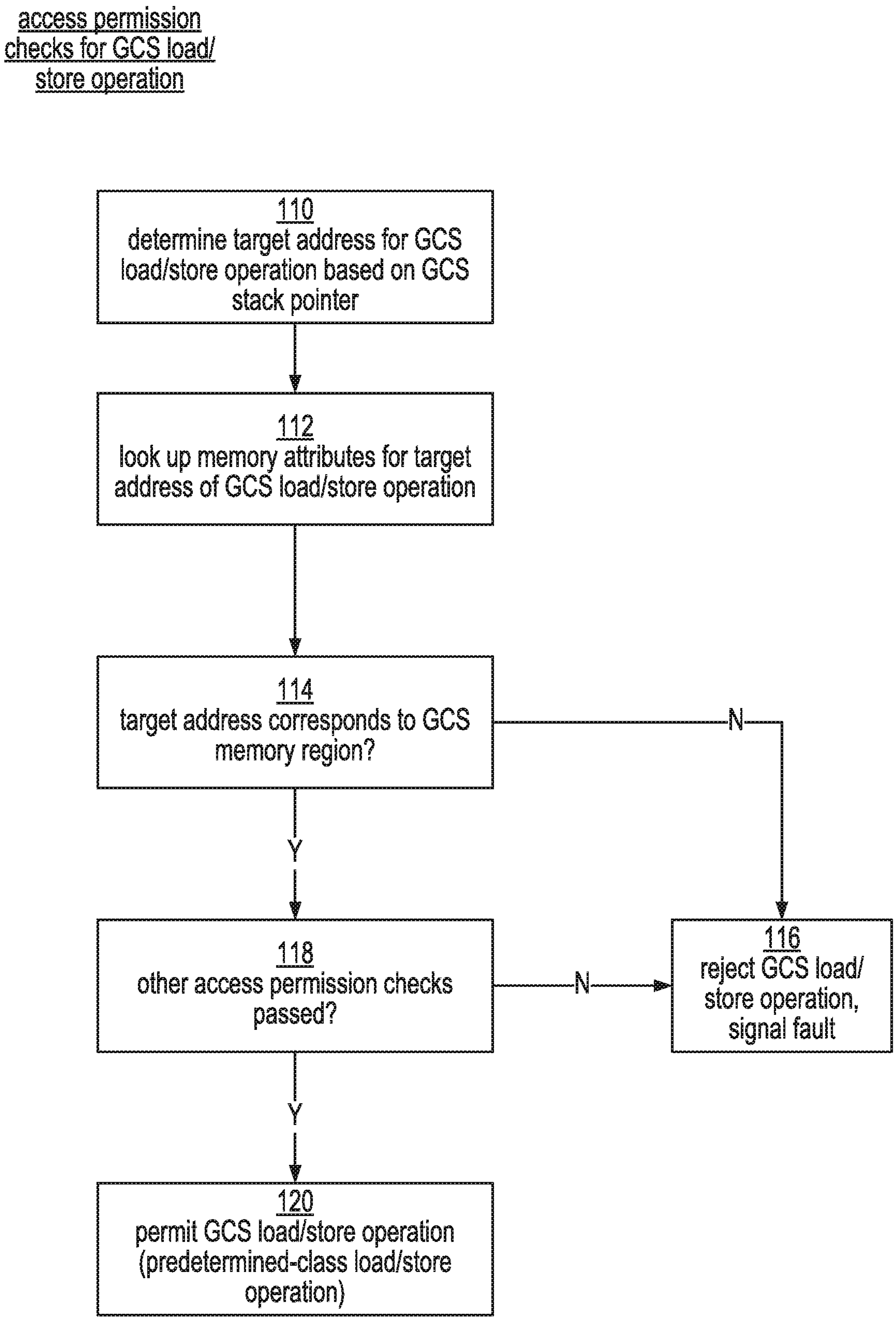
FIG. 6 illustrates access permission checks for a GCS load/store operation.

FIG. 6 is a flow diagram illustrating access permission checks for a GCS load/store operation. At step 110 the GCS load/store pipeline 70 determines the target address for a GCS load/store operation based on the GCS stack pointer. At step 112 the GCS load/store pipeline 70 (or, in some cases, the memory management unit 28) looks up the address in the GCS L1 TLB 72, to obtain memory attributes for the target address of the GCS load/store operation. At step 114, the GCS load/store pipeline 70 or the MMU 28 determines whether the target address corresponds to a GCS memory region, which is a dedicated type of memory region for use for storing the GCS data structure. If the target address does not correspond to the GCS memory region type, then at step 116 the GCS load/store operation is rejected. A fault is signalled, which may interrupt the processing being performed and cause an exception handler to deal with the cause of the fault. By suppressing GCS accesses to regions not marked as the GCS memory region type, this prevents GCS load/store instructions being misused for accessing non-GCS memory, and also means that the protected return state returned by GCS load operation can be trusted because it cannot have been tampered with by non-GCS instructions.

If at step 114 the target address was determined correspond to a GCS memory region, then at step 118 the GCS load/store pipeline 70 or the MMU 28 determines whether any other access permission checks are passed. These checks could check other attributes such as read/write permission information indicating whether read requests and write request respectively are permitted to be memory region, or attributes defining a subset of execution states of the processor 2 in which the region is allowed to be accessed. If any other access permission checking failed then again at step 116 the GCS load/store operation is rejected and a fault is signalled. Fault type information set by the processor on occurrence of the fault may differ depending on whether the cause of the fault was a GCS access to a non-GCS memory region or another type of access permission violation. If all other access permission checks are passed then at step 120 the GCS load/store operation is permitted. The GCS load/store operation is an example of the predetermined-class load/store operation described earlier.

Figure 7:
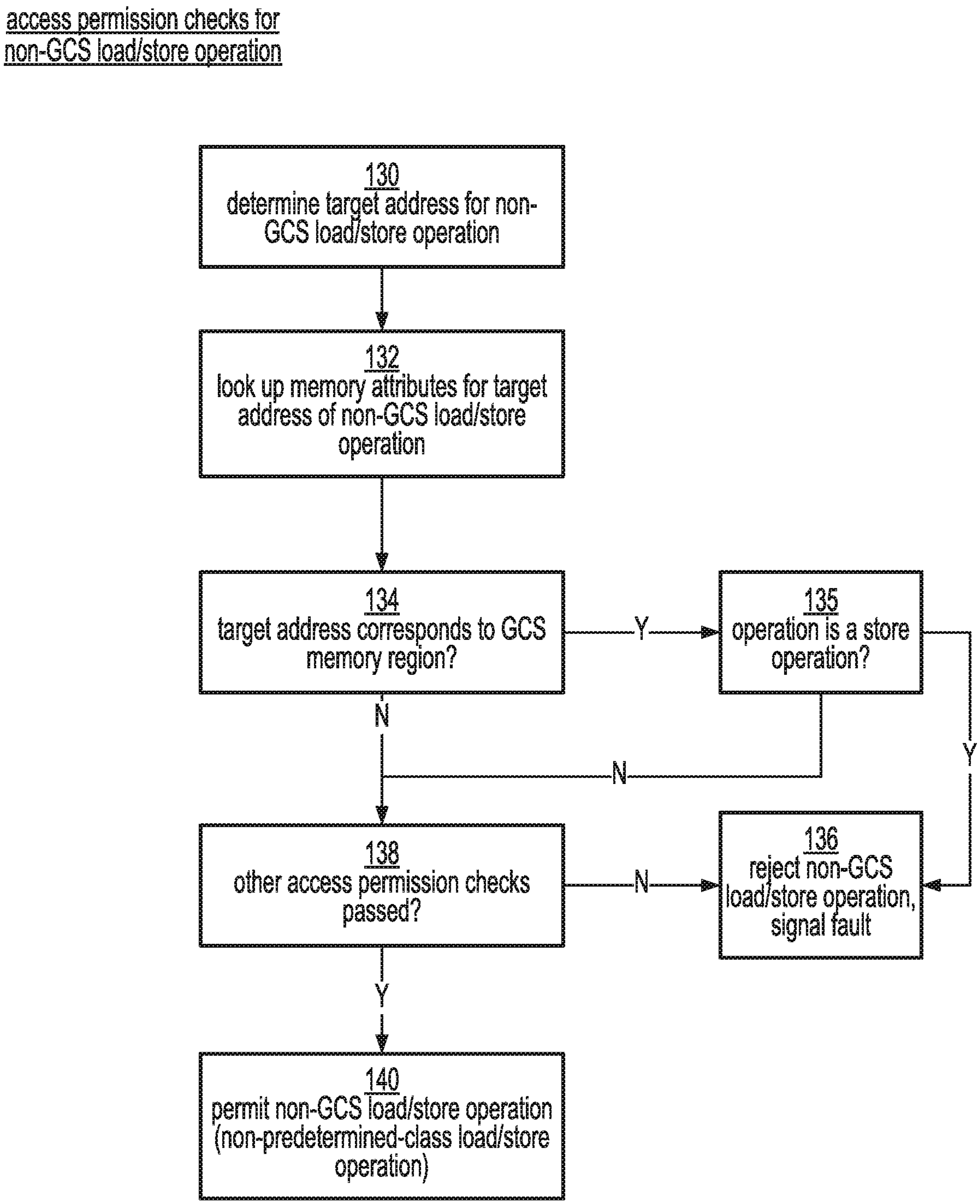
FIG. 7 illustrates access permission checks for a non-GCS load/store operation.

FIG. 7 shows similar access permission checks performed for a non-GCS load/store operation. Steps 130, 132 and 134 are similar to steps 110, 112, 114 of FIG. 6, except that the target address is determined for the non-GCS load/store operation by the general load/store pipeline 50 instead of the GCS load/store pipeline 70, and at step 112 the memory attribute lookup is performed in the general L1 TLB 52 instead of the GCS L1 TLB 72. Also, compared to FIG. 6, at step 134 of FIG. 7 the response to the check of whether the target address corresponds the GCS memory region is the opposite way round for non-GCS load/store operations compared to GCS load/store operations, in that when the target address corresponds to a GCS memory region non-GCS store operations are rejected, while GCS load/store operations are rejected if the target address does not correspond to a GCS memory region.

Hence, if it is determined at step 134 that the target address corresponds to the GCS memory region, and it is determined at step 135 that the current load/store operation is a non-GCS store operation, then at step 136 the non-GCS load/store operation is rejected and the fault is signalled. Non-GCS load operations may potentially be allowed even if they target a GCS memory region, subject to the outcome of any other access permission checks performed at step 138. If any other access permission checks fail then again the non-GCS load/store operation is rejected. Otherwise, if either the target address does not correspond to a GCS memory region (N at step 134) or the non-GCS operation is a load operation N at step 135), and any other access permission checks (not relating to GCS access checking) are passed at step 138, then at step 140 the non-GCS load/store operation is permitted. The non-GCS load/store operation is an example of the non-predetermined-class load/store operation described earlier.

Figure 8:
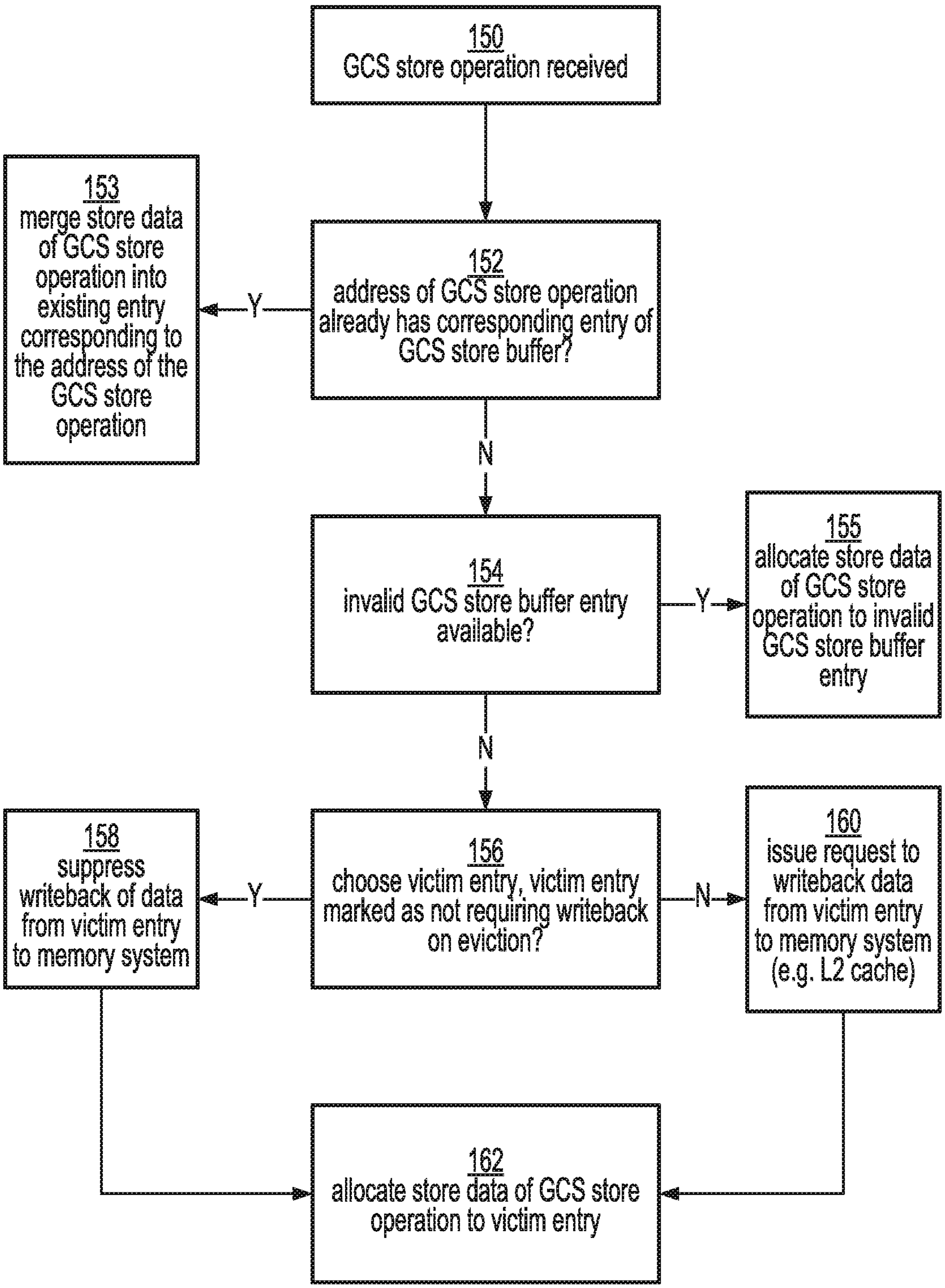
FIG. 8 illustrates processing of a GCS store operation.

FIG. 8 illustrates processing of a GCS store operation using the GCS load/store pipeline 70 (FIG. 8 omits the access permission checking performed for the GCS store operation, which can be performed as in FIG. 6). At step 150, a GCS store operation is received by the GCS load/store pipeline. This is a store operation triggered by a GCS push instruction being decoded by the instruction decoder 10. At step 152, the GCS load/store pipeline 70 checks whether the address of the GCS store operation already has a corresponding entry allocated in the GCS store buffer 74. If so, then the store data of the GCS store operation is merged into the existing entry corresponding to the address of the GCS store operation.

If there is no existing entry in the GCS store buffer 74 for the address of the GCS store operation, then at step 154, the GCS load/store pipeline 70 checks whether an invalid GCS store buffer entry is available, and if so then at step 155 the store data of the GCS store operation is allocated to the invalid GCS store buffer entry.

If there is no invalid GCS store buffer entry available, then at step 156 a victim entry of the GCS store buffer is selected (some implementations of the GCS store buffer may only have one entry, in which case that entry is the victim entry, but if the GCS store buffer has more than one entry then any known victim selection policy may be applied to select which entry is evicted). The GCS load/store pipeline 70 determines whether the victim entry is marked as not requiring writeback on eviction (see FIG. 9 discussed below which explains how the "not requiring writeback on eviction" status can be set in response to a GCS load operation). If the victim entry is marked as not requiring writeback on eviction, then at step 158 writeback of data from the victim entry to the memory system is suppressed, even if that data is dirty. If the victim entry is not marked as not requiring writeback on eviction, then if there is any dirty data in the evicted entry, a request to write back the data from the victim entry to the memory system (e.g. to the L2 cache 32) is issued at step 160. Regardless of whether the writeback is suppressed or performed, at step 162 the store data of the GCS store operation is allocated to the victim entry.

Figure 9:
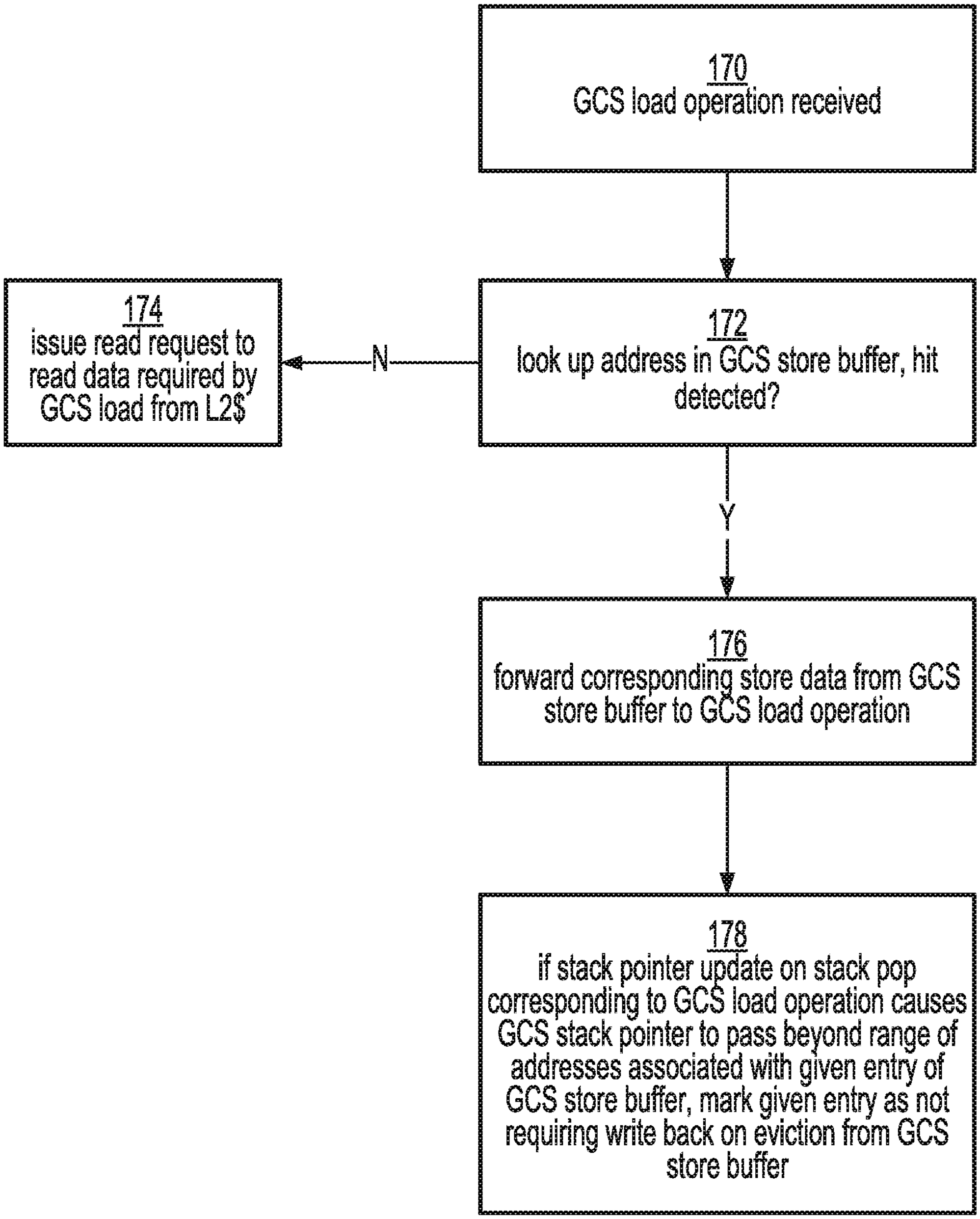
FIG. 9 illustrates processing of a GCS load operation.

FIG. 9 illustrates processing of a GCS load operation. At step 170 a GCS load operation is received by the GCS load/store pipeline. This is a load operation triggered by a GCS pop instruction being decoded by the instruction decoder 10. Again, any access permission checking for the instruction is not shown in FIG. 9, but can be performed as shown in FIG. 6. At step 172, the GCS load/store pipeline 70 checks whether the address of the GCS load operation has a corresponding entry allocated in the GCS store buffer 74. If not, then at step 174 the GCS load/store pipeline issues a read request to request reading of the data required by the GCS load operation from the L2 cache 32. If the address of the GCS load operation hits in the GCS store buffer then at step 176 the store data corresponding to that address is forwarded from the GCS store buffer 74 to the GCS load operation, and the GCS load/store pipeline can then forward that data for writeback to the destination register of the GCS load operation by the writeback stage 18 of the processing pipeline 4.

At step 178, the GCS load/store pipeline determines whether any stack pointer update made for the stack pop operation corresponding to the GCS load operation has caused the GCS stack pointer to pass beyond a given entry of the GCS store buffer 74 (after previously having been at an address corresponding to that given entry). If so, then this means that the data associated with that given entry has already been consumed by GCS pop operations and so is unlikely to be needed again. Therefore, the given entry is marked as not requiring writeback on eviction from the GCS store buffer 74. This will mean that if that entry is selected as a victim entry as discussed above for FIG. 8, a writeback of the entry can be suppressed to save power and improve performance other load/store operations which may require a cache access.

Figure 10:
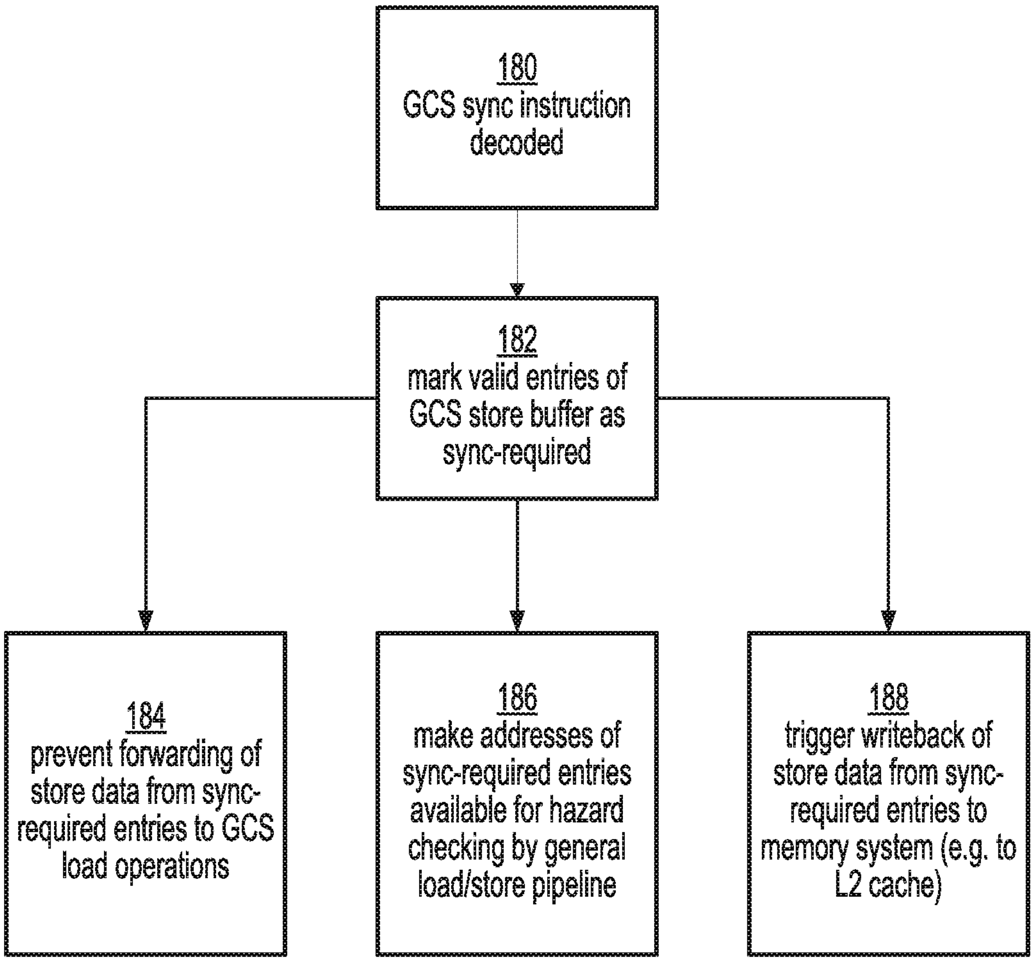
FIG. 10 illustrates processing of a GCS synchronization instruction, which is an example of a predetermined-class load/store synchronization instruction.

FIG. 10 illustrates processing a GCS synchronization instruction, which is an example of the predetermined-class-load/store synchronization instruction described earlier. At step 180, the instruction decoder 10 decodes the GCS synchronization instruction. In response, the instruction decoder 10 controls the load/store processing circuitry 26 to mark any valid entries of the GCS store buffer 74 as being in a synchronization-required state. For example, each GCS store buffer entry may have a corresponding flag indicating whether the entry is in the synchronization-required state. Alternatively, if the GCS store buffer 74 only has a single entry then there may be a flag indicating whether the GCS store buffer as a whole is considered synchronization-required or not.

Also, in response to decoding of the GCS synchronization instruction, the GCS load/store pipeline 70 performs a number of operations, which can be performed in any order with respect to each other and so are shown in parallel in FIG. 10, although they could also be performed sequentially.

At step 184 the GCS load/store pipeline 70 prevents forwarding of store data from the synchronization-required entries to GCS load operations. Once the GCS synchronization instruction has signalled that a non-GCS load/store operation may interact with the address specified by a given synchronization-required entry of the GCS store buffer, then there is a risk that an intervening non-GCS store operation could change the value of data associated with an address in the period between an older GCS store and a younger GCS load accessing that address, so that it is no longer safe to forward data from the older GCS store to the younger GCS load. Providing circuitry to check for the presence of intervening non-GCS load/store operations to an overlapping address would require more complex circuit logic, so it can be more efficient simply to prevent forwarding of store data from the synchronization-required entries of the GCS store buffer to other GCS load operations.

Also, at step 186, the GCS load/store operation makes the addresses of the synchronization-required entries of the GCS store buffer available for hazard checking by the hazard checking circuitry 60 associated with the general load/store pipeline 50. This ensures that the general load/store operations can be hazarded against the addresses associated with GCS stores which are older in program order than the GCS synchronization instruction, to ensure that they observe the result of such older GCS stores.

Also, at step 188, the GCS load/store pipeline 70 triggers writeback of store data from the synchronization-required entries of the GCS store buffer 74 to the memory system (e.g. to the L2 cache 32). This is performed even if the synchronization-required entries are not yet required to be evicted from the GCS store buffer to make way for an entry to be allocated for a different address. By triggering draining of store data from the GCS store buffer 74 to the memory system in response to the GCS synchronization instruction, the store data becomes visible sooner to younger non-GCS load/store operations.

Figure 11:
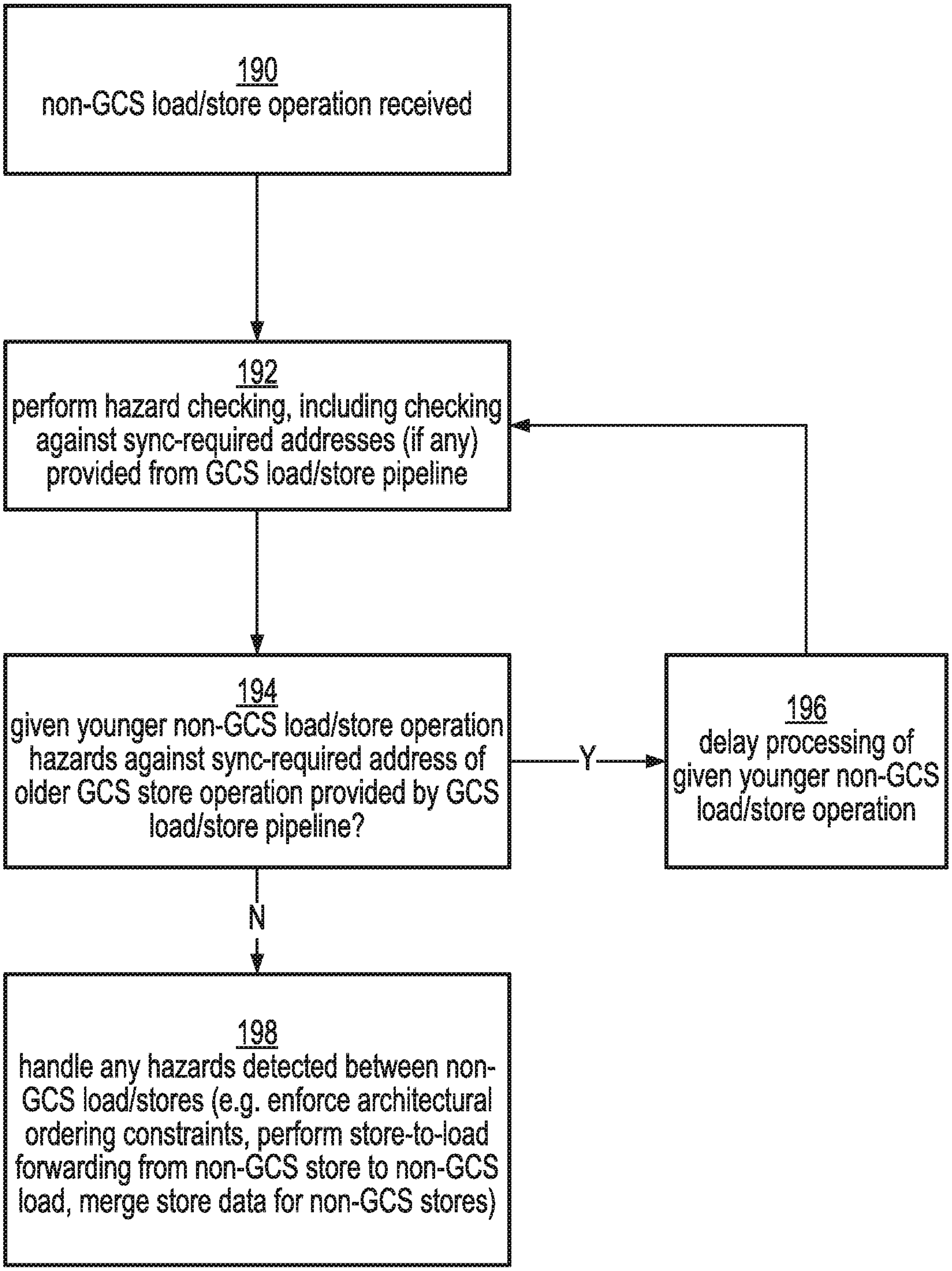
FIG. 11 illustrates processing of a non-GCS load/store operation.

FIG. 11 illustrates processing of a non-GCS load/store operation using the general load/store pipeline 50. At step 190, a non-GCS load/store operation is received. This is a load/store operation which is triggered by the instruction decoder 10 decoding an instruction other than one of the GCS-accessing types of instructions. The access permission checking shown in FIG. 7 is performed for the non-GCS load/store operation.

At step 192 the hazard checking circuitry 60 associated with the general load/store pipeline 50 performs hazard checking for the non-GCS load/store operation, including checking the address of the non-GCS load/store operation against any synchronization-required addresses (if there are any) provided from the GCS load/store pipeline. For example, the signal path for transferring addresses of synchronization-required GCS store buffer entries to the hazard checking circuitry 60 may qualify those addresses with an indicator which indicates whether or not the synchronization-required status has been asserted for those addresses, so that those addresses are ignored for the purpose of hazard checking unless they have been identified as synchronization-required.

At step 194, the hazard checking circuitry 60 determines whether a given younger non-GCS load/store operation hazards against the address of an older GCS store operation which has been identified as requiring synchronization (due to the presence of an intervening GCS synchronization instruction appearing in program order between the instructions which triggered the older GCS store operation and the given younger non-GCS load/store operation). If so, then at step 196 processing of the given younger non-GCS load/store operation is delayed. For example the younger non-GCS load/store operation can be removed from the general load/store pipeline to be reissued later, or could be allocated to a replay queue which queues delayed load/store operations, and can be retried sometime later, either after an arbitrary retry time interval (whose elapse is not necessarily triggered by any confirmation that the cause of the hazard has been resolved), or once a signal has been received to indicate that the hazard has resolved (e.g. when any synchronization-required entries of the GCS store buffer 74 have been drained to a point where the store data is observable by the younger non-GCS load/store operation). If there is no hazard of the non-GCS load/store operation against an older GCS store operation where synchronization is required, then at step 198 the hazard checking circuitry checks for any other hazards detected between respective non-GCS load/store operations. This may be performed according to any known hazard checking technique, and may include enforcement of architectural ordering constraints (such as ensuring that load/store operations to the same address are handled in program order or enforcing any memory barriers), performing store-to-load forwarding from a non-GCS store operation to a non-GCS load operation, and merging of store data for a younger store into an entry allocated previously by an older store in the store buffer 58. Unlike the synchronization between GCS and non-GCS load/store operations, for respective non-GCS load/store operations there is no need for any intervening synchronization instruction to be executed to enforce that a younger non-GCS load/store observes the result of an older non-GCS store.

Figure 12:
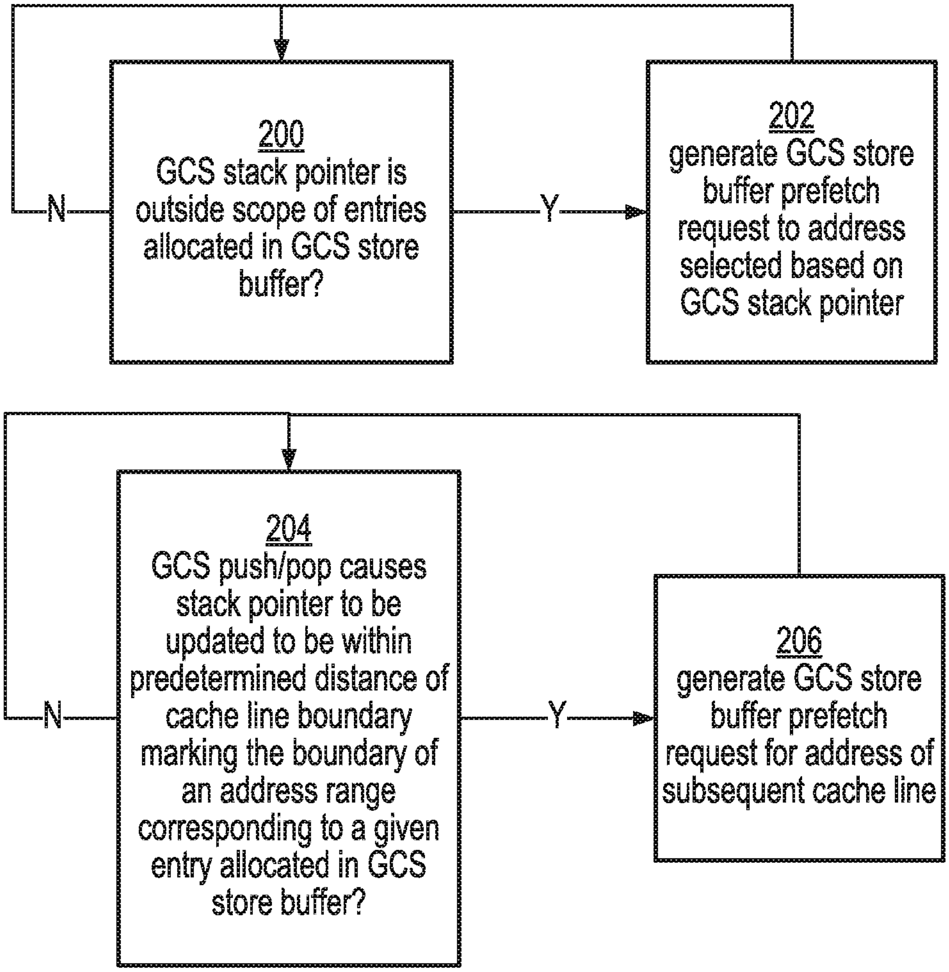
FIG. 12 illustrates generation of GCS store buffer prefetch requests.

FIG. 12 illustrates prefetching of data to the GCS store buffer 74 by the GCS store buffer prefetch circuitry 80. At step 200 the GCS store buffer prefetch circuitry 80 detects whether the GCS stack pointer has gone outside the scope of any entries are allocated in the GCS store buffer. For example, it is detected whether GCS stack pointer is outside any ranges of addresses associated with valid entries of the GCS store buffer 74. If so, then at step 202 the GCS store buffer prefetch circuitry 80 generates a prefetch request to request that data associated with an address selected based on the GCS stack pointer value is prefetched to the GCS store buffer 74.

At step 204, the GCS store buffer prefetch circuitry also checks whether a GCS push or pop operation has caused the GCS stack pointer to be updated to be within a predetermined distance of a cache line boundary marking the boundary of an address range corresponding to a given entry allocated in GCS store buffer. This may be an indication that future GCS push or pop operations are likely to access the subsequent cache line beyond that cache line boundary. Therefore, at step 260 GCS store buffer prefetch circuitry 80 generates a GCS store buffer prefetch request to request that data associated with the address of the subsequent cache line is brought in from the cache 32 to the GCS store buffer 74.

For all the flow diagrams shown in this application, it will be appreciated that while steps are shown sequentially in a certain order, it is possible to reorder steps so as to perform them in a different order or at least partially in parallel.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

load/store processing circuitry to process load/store operations, where for a predetermined class of load/store operations, the load/store processing circuitry is configured to buffer store data of store operations of the predetermined class in a predetermined-class store buffer, and control store-to-load forwarding of store data from the predetermined-class store buffer to load operations of the predetermined class; and an instruction decoder responsive to a predetermined-class-load/store synchronization instruction to control the load/store processing circuitry to enforce that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation; in which:

in absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the load/store processing circuitry is configured to permit the given younger non-predetermined-class load/store operation to yield a result which fails to observe a result of the given older predetermined-class store operation.

2. The apparatus according to claim 1, in which the load/store processing circuitry is incapable of performing store-to-load forwarding of store data from predetermined-class store operations to non-predetermined-class load operations using the predetermined-class store buffer.

3. The apparatus according to claim 1, in which the predetermined-class store buffer is separate from a non-predetermined-class store buffer used by the load/store processing circuitry to buffer store data for non-predetermined-class store operations.

4. The apparatus according to claim 1, in which the load/store processing circuitry is configured to process the predetermined class of load/store operations using a separate load/store pipeline from a load/store pipeline used for non-predetermined-class load/store operations.

5. The apparatus according to claim 1, in which the load/store processing circuitry is configured to perform an address translation lookup for the predetermined class of load/store operations in a separate level-1 address translation cache from a level-1 address translation cache looked up for non-predetermined-class load/store operations.

6. The apparatus according to claim 1, in which, the load/store processing circuitry is configured to issue cache read/write requests triggered by the predetermined class of load/store operations to a further-level cache, bypassing a first-level cache used to handle cache read/write requests triggered by non-predetermined-class load/store operations.

7. The apparatus according to claim 1, in which in response to the instruction decoder decoding the predetermined-class-load/store synchronization instruction, the load/store processing circuitry is configured to trigger writeback, from the predetermined-class store buffer to a memory system, of store data associated with one or more older predetermined-class store operations occurring before the predetermined-class-load/store synchronization instruction in program order.

8. The apparatus according to claim 1, in which, in response to the instruction decoder decoding the predetermined-class-load/store synchronization instruction, the load/store processing circuitry is configured to cause processing of the hazarding younger non-predetermined-class load/store operation to be delayed to give time for store data of the hazarding older predetermined-class store operation to drain from the predetermined-class store buffer to a point at which the store data is observable by the hazarding younger non-predetermined-class load/store operation.

9. The apparatus according to claim 1, in which in response to the instruction decoder decoding the predetermined-class-load/store synchronization instruction, the load/store processing circuitry is configured to prevent store-to-load forwarding, to predetermined-class load operations, of store data from the predetermined-class store buffer associated with older predetermined-class store operations occurring before the predetermined-class-load/store synchronization instruction in program order.

10. The apparatus according to claim 1, in which the predetermined class of load/store operations comprise load/store operations triggered by decoding of a predetermined class of load/store instructions by the instruction decoder.

11. The apparatus according to claim 1, in which the predetermined class of load/store operations comprise stack-accessing load/store operations to perform a stack pop/push operation, where a target address of the stack pop/push operation depends on a stack pointer.

12. The apparatus according to claim 11, comprising predetermined-class store buffer prefetch circuitry to prefetch data to the predetermined-class store buffer for addresses predicted based on the stack pointer.

13. The apparatus according to claim 12, in which, in response to a stack pop/push operation for a predetermined-class load/store operation which triggers the stack pointer to be updated to be within a predetermined distance of a cache line boundary, the predetermined-class store buffer prefetch circuitry is configured to prefetch a subsequent cache line to the predetermined-class store buffer.

14. The apparatus according to claim 12, in which, in response to detecting that the stack pointer points to an address not having a valid entry in the predetermined-class store buffer, the predetermined-class store buffer prefetch circuitry is configured to prefetch a cache line selected based on the stack pointer to the predetermined-class store buffer.

15. The apparatus according to claim 11, in which, following one or more stack pop operations causing the stack pointer to pass beyond a range of addresses associated with a given entry of the predetermined-class store buffer, on eviction of the store data from the given entry of the predetermined-class store buffer, the load/store processing circuitry is configured to suppress writeback of the store data from the given entry to a memory system.

16. The apparatus according to claim 1, in which the predetermined class of load/store operations comprise load/store operations for accessing a guarded control stack (GCS) data structure for protecting return state information for returning from a function call or exception.

17. The apparatus according to claim 16, in which the load/store processing circuitry is configured to reject a non-predetermined-class store operation specifying a target address, in response to determining that a memory region corresponding to the target address is specified by memory attribute data as being a GCS region for storing the GCS data structure.

18. The apparatus according to claim 16, in which the load/store processing circuitry is configured to reject a predetermined-class load/store operation specifying a target address, in response to determining that a memory region corresponding to the target address is specified by memory attribute data as being a region other than a GCS region for storing the GCS data structure.

19. The apparatus according to claim 1, in which the predetermined-class-load/store synchronization instruction imposes no additional ordering constraints between an earlier non-predetermined-class load/store instruction occurring before the predetermined-class-load/store synchronization instruction in program order and a later non-predetermined-class load/store instruction occurring after the predetermined-class-load/store synchronization instruction in program order.

20. A non-transitory computer-readable medium to store computer-readable code for fabrication of the apparatus according to claim 1.

21. A method comprising:

for a predetermined class of load/store operations, buffering store data of store operations of the predetermined class in a predetermined-class store buffer, and controlling store-to-load forwarding of store data from the predetermined-class store buffer to load operations of the predetermined class;

in response to a predetermined-class-load/store synchronization instruction, controlling load/store processing circuitry to control that, for a hazarding younger non-predetermined-class load/store operation occurring after the predetermined-class-load/store synchronization instruction in program order and a hazarding older predetermined-class store operation occurring before the predetermined-class-load/store synchronization instruction in program order, for which an address range accessed by the hazarding younger non-predetermined-class load/store operation overlaps with an address range accessed by the hazarding older predetermined-class store operation, the hazarding younger non-predetermined-class load/store operation observes a result of the hazarding older predetermined-class store operation; in which:

in absence of any intervening predetermined-class-load/store synchronization instruction occurring in program order between a given older predetermined-class store operation and a given younger non-predetermined-class load/store operation for which an address range accessed by the given older predetermined-class store operation overlaps with an address range accessed by the given younger non-predetermined-class load/store operation, the given younger non-predetermined-class load/store operation is permitted to yield a result which fails to observe a result of the given older predetermined-class store operation.

22. An apparatus comprising:

load/store processing circuitry to process load/store operations, including guarded-control-stack (GCS) load/store operations for accessing a GCS data structure for protecting return state information for returning from a function call or exception; and an instruction decoder responsive to a GCS synchronization instruction to control the load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation; in which:

in absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the load/store processing circuitry is configured to permit the given younger non-GCS load/store operation to yield a result which fails to observe a result of the given older GCS store operation.

23. A non-transitory computer-readable medium to store computer-readable code for fabrication of the apparatus according to claim 22.

24. A method comprising:

processing load/store operations, including guarded-control-stack (GCS) load/store operations for accessing a GCS data structure for protecting return state information for returning from a function call or exception; and in response to a GCS synchronization instruction, controlling load/store processing circuitry to enforce that, for a hazarding younger non-GCS-load/store operation occurring after the GCS synchronization instruction in program order and a hazarding older GCS store operation occurring before the GCS synchronization instruction in program order, for which an address range accessed by the hazarding younger non-GCS load/store operation overlaps with an address range accessed by the hazarding older GCS store operation, the hazarding younger non-GCS load/store operation observes a result of the hazarding older GCS store operation; in which:

in absence of any intervening GCS synchronization instruction occurring in program order between a given older GCS store operation and a given younger non-GCS load/store operation for which an address range accessed by the given older GCS store operation overlaps with an address range accessed by the given younger non-GCS load/store operation, the given younger non-GCS load/store operation is permitted to yield a result which fails to observe a result of the given older GCS store operation.

* * * * *